(12) United States Patent
Ikuta et al.

(10) Patent No.: US 10,337,688 B2
(45) Date of Patent: Jul. 2, 2019

(54) VEHICLE LAMP

(71) Applicant: KOITO MANUFACTURING CO., LTD., Minato-ku, Tokyo (JP)

(72) Inventors: Ryujiro Ikuta, Shizuoka (JP); Yukihiro Onoda, Shizuoka (JP); Kunio Fukai, Shizuoka (JP); Masaya Shido, Shizuoka (JP); Hironori Tsukamoto, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 192 days.

(21) Appl. No.: 14/777,098

(22) PCT Filed: Mar. 13, 2014

(86) PCT No.: PCT/JP2014/056616
§ 371 (c)(1),
(2) Date: Sep. 15, 2015

(87) PCT Pub. No.: WO2014/156668
PCT Pub. Date: Oct. 2, 2014

(65) Prior Publication Data
US 2016/0040847 A1    Feb. 11, 2016

(30) Foreign Application Priority Data

Mar. 27, 2013 (JP) .................. 2013-066666
May 14, 2013 (JP) .................. 2013-102248

(51) Int. Cl.
*F21S 43/145* (2018.01)
*B60Q 1/26* (2006.01)
(Continued)

(52) U.S. Cl.
CPC .......... *F21S 43/145* (2018.01); *B60Q 1/0041* (2013.01); *B60Q 1/2607* (2013.01);
(Continued)

(58) Field of Classification Search
CPC ...... F21S 48/1323; F21S 41/147; F21S 41/36; F21S 41/321; F21S 43/315; F21S 43/31;
(Continued)

(56) References Cited

U.S. PATENT DOCUMENTS 6,168,293 B1    1/2001   Lieszkovszky et al.
7,857,495 B2 *  12/2010  Misawa ............... B60Q 1/2607
                                                         362/511
(Continued)

FOREIGN PATENT DOCUMENTS

GB    2496183 A       5/2013
JP    2001-101906 A   4/2001
(Continued)

OTHER PUBLICATIONS

International Search Report dated May 20, 2014 issued by International Searching Authority in counterpart International Application No. PCT/JP2014/056616.
(Continued)

*Primary Examiner* — Anh T Mai
*Assistant Examiner* — Nathaniel J Lee
(74) *Attorney, Agent, or Firm* — Sughrue Mion, PLLC

(57) ABSTRACT

A planar light emitting body 6 configured to emit a first illumination light, and a semiconductor light emitting element 7 configured to emit light toward the planar light emitting body 6 are disposed in a lamp chamber 5 defined by a lamp housing 2 having an opening and a cover 3 that covers the opening. The planar light emitting body 6 includes a transmitting layer through which light is caused to pass, and a control layer configured to irradiate light as a second illumination light by controlling a travelling direction of the light that is emitted from the semiconductor light emitting element 7 and passes through the transmitting layer.

4 Claims, 21 Drawing Sheets

(51) Int. Cl.
  *B60Q 1/00* (2006.01)
  *F21S 41/147* (2018.01)
  *F21S 41/32* (2018.01)
  *F21S 41/36* (2018.01)
  *F21S 43/14* (2018.01)
  *F21S 43/237* (2018.01)
  *F21S 43/239* (2018.01)
  *F21S 43/245* (2018.01)
  *F21S 43/247* (2018.01)
  *F21S 43/31* (2018.01)
  *F21S 43/33* (2018.01)
  *F21V 8/00* (2006.01)
  *F21S 41/365* (2018.01)

(52) U.S. Cl.
  CPC ........... *F21S 41/147* (2018.01); *F21S 41/321* (2018.01); *F21S 41/36* (2018.01); *F21S 43/14* (2018.01); *F21S 43/237* (2018.01); *F21S 43/239* (2018.01); *F21S 43/245* (2018.01); *F21S 43/247* (2018.01); *F21S 43/31* (2018.01); *F21S 43/315* (2018.01); *F21S 43/33* (2018.01); *F21S 41/365* (2018.01); *G02B 6/0015* (2013.01)

(58) Field of Classification Search
  CPC ........ F21S 43/245; F21S 43/239; F21S 43/14; F21S 43/33; F21S 43/247; F21S 43/237; B60Q 1/0041; B60Q 1/2607
  See application file for complete search history.

(56) References Cited

U.S. PATENT DOCUMENTS

2006/0077683 A1* 4/2006 Muller ................. B60Q 1/0052
                                                              362/544
2008/0186726 A1   8/2008 Okada
2009/0262545 A1* 10/2009 Amelung ................. B60Q 1/34
                                                              362/487
2011/0170290 A1*  7/2011 Hikmet ............. H05B 33/0863
                                                              362/235
2012/0113632 A1   5/2012 Aoyama et al.
2012/0161116 A1   6/2012 Aoyama et al.
2012/0163031 A1   6/2012 Okada et al.

FOREIGN PATENT DOCUMENTS

| | | |
|---|---|---|
| JP | 2006-196196 A | 7/2006 |
| JP | 2007-276726 A | 10/2007 |
| JP | 2008-186786 A | 8/2008 |
| JP | 2009-252572 A | 10/2009 |
| JP | 2009-266818 A | 11/2009 |
| JP | 2011-23299 A | 2/2011 |
| JP | 2011-150887 A | 8/2011 |
| JP | 2012-64535 A | 3/2012 |
| JP | 2012-114083 A | 6/2012 |
| JP | 2012-119199 A | 6/2012 |
| JP | 2012-151101 A | 8/2012 |
| JP | 2012-156074 A | 8/2012 |

OTHER PUBLICATIONS

Written Opinion dated May 20, 2014 issued by International Searching Authority in counterpart International Application No. PCT/JP2014/056616.

Communication dated Sep. 27, 2016 issued by the Japanese Patent Office in counterpart Japanese Patent Application No. 2013-066666.

Communication dated Nov. 29, 2016, issued by the Japanese Patent Office in counterpart Japanese Patent Application No. 2013-102248.

* cited by examiner

VEHICLE LAMP

TECHNICAL FIELD

The present invention relates to a vehicle lamp where a planar light emitting body is used as a light source.

BACKGROUND ART

As this type of vehicle lamp, there has been known a vehicle lamp where a planar light emitting body as a light source and another light source are disposed within a lamp outer housing configured by a cover and a lamp housing (e.g., see Patent Document 1).

In the vehicle lamp disclosed in Patent Document 1, the planar light emitting body having a self-luminous organic EL (Electro Luminescence) layer is used, and a halogen lamp or a discharge lamp is used as another light source.

According to this configuration, the planar light emitting body can be used as a reflector for reflecting light emitted from another light source.

In a vehicle lamp disclosed in Patent Document 2, a plurality of flat planar light emitting bodies is used as a light source. The plurality of planar light emitting bodies is disposed at places corresponding to the shape of the lamp outer housing, respectively. Further, the plurality of planar light emitting bodies is arranged so as to emit light in the same direction.

CITATION LIST

Patent Document

Patent Document 1: Japanese Patent Laid-Open Publication No. 2006-196196
Patent Document 2: Japanese Patent Laid-Open Publication No. 2011-150887

DISCLOSURE OF INVENTION

Problems to be Solved by Invention

In the vehicle lamp disclosed in Patent Document 1, heat is generated by light emitted from a halogen lamp or a discharge lamp which is used as another light source. Therefore, it is necessary to provide a heat-resistant structure or a heat-radiation structure for the planar light emitting body. As a result, an increase in the manufacturing cost and constraints on a degree of freedom for the design are caused.

Particularly, a substrate of a planar light emitting body is often formed of a resin material in order to secure flexibility. In this case, there is a possibility that the substrate is melted by light emitted from the halogen lamp or the discharge lamp which is used as another light source.

Therefore, a first object of the present invention is to reduce the manufacturing cost and to improve a degree of freedom for the design.

In the case where a plurality of planar light emitting bodies is arranged as in the vehicle lamp disclosed in Patent Document 2, a gap is easily formed between each of the planar light emitting bodies. When such a gap is present, a dark portion is formed in a light distribution pattern, and thus, there is a possibility of causing the discomfort to a driver.

Therefore, a second object of the present invention is to avoid giving the discomfort to a driver by suppressing the occurrence of a dark portion in a light distribution pattern.

Means for Solving the Problems

A first embodiment made by the present invention in order to achieve the first object is a vehicle lamp comprising:
a lamp chamber defined by a lamp housing having an opening and a cover that covers the opening;
a planar light emitting body disposed in the lamp chamber and configured to emit a first illumination light; and
a semiconductor light emitting element disposed in the lamp chamber and configured to emit light toward the planar light emitting body,
wherein the planar light emitting body comprises
a transmitting layer through which light is caused to pass; and
a control layer configured to irradiate light as a second illumination light by controlling a travelling direction of the light that is emitted from the semiconductor light emitting element and passes through the transmitting layer.

According to this configuration, the heat generation by the light incident on the planar light emitting body is suppressed. Accordingly, there is no need to provide a special heat-resistance structure and heat-radiation structure for the planar light emitting body. As a result, it is possible to reduce the manufacturing cost and it is also possible to improve a degree of freedom for the design.

The control layer may comprise a reflective layer configured to reflect the light emitted from the semiconductor light emitting element.

According to this configuration, the light emitted from the semiconductor light emitting element is reflected by the reflective layer, so that a travelling direction of the light is controlled.

The planar light emitting body and the semiconductor light emitting element may be arranged such that the light emitted from the semiconductor light emitting element is incident from a first end surface of the planar light emitting body and is guided in the interior of the planar light emitting body and irradiated as the second illumination light.

According to this configuration, the light emitted from the semiconductor light emitting element is guided in the interior of the planar light emitting body and emitted from predetermined positions, so that the travelling direction of the light is controlled.

The planar light emitting body and the semiconductor light emitting element may be arranged such that the light incident on the first end surface is guided in the interior of the planar light emitting body and emitted from a second end surface of the planar light emitting body.

According to this configuration, the entire planar light emitting body serves as a light guide.

The control layer may have concave and convex portions.

According to this configuration, the travelling direction of the light emitted from the semiconductor light emitting element is controlled through the concave and convex portions.

A second embodiment made by the present invention in order to achieve the second object is a vehicle lamp comprising:
a lamp chamber defined by a lamp housing having an opening and a cover for closing the opening;
a plurality of planar light emitting bodies arranged at a gap in the lamp chamber; and
a light source body of which at least a portion is arranged on a line intersecting with the gap.

According to this configuration, light is emitted from a plurality of planar light emitting bodies and a light source body disposed on a line intersecting with the gap. Therefore, the occurrence of a dark portion in a light distribution pattern formed by the vehicle lamp is suppressed. As a result, it is possible to avoid giving the discomfort to a driver.

At least the portion of the light source body may be disposed within the gap.

According to this configuration, the gap can be utilized as a portion of a space for arranging the light source body.

At least the portion of the light source body may be disposed on the side where light is emitted from the planar light emitting bodies, than the planar light emitting bodies.

According to this configuration, the light emitted from the light source body is not shielded by an outer peripheral portion of the planar light emitting body.

The light source body may comprise a light guide. In this case, the light guide is extended in a direction intersecting with a direction in which light is emitted from the planar light emitting body, and is arranged along the gap.

According to this configuration, light is guided along the gap by the light guide.

At least a portion of the light guide may be disposed on the side where light is emitted from the planar light emitting bodies, than the planar light emitting bodies. In this case, a dimension in a width direction of the gap of at least the portion of the light guide, which is disposed on the side where the light is emitted, is greater than a width of the gap.

According to this configuration, light can be emitted from a position facing the outer peripheral portion of the planar light emitting body.

EMBODIMENT FOR CARRYING OUT INVENTION

Hereinafter, an example of an embodiment according to the present invention will be described in detail with reference to the accompanying drawings.

Figure 1:
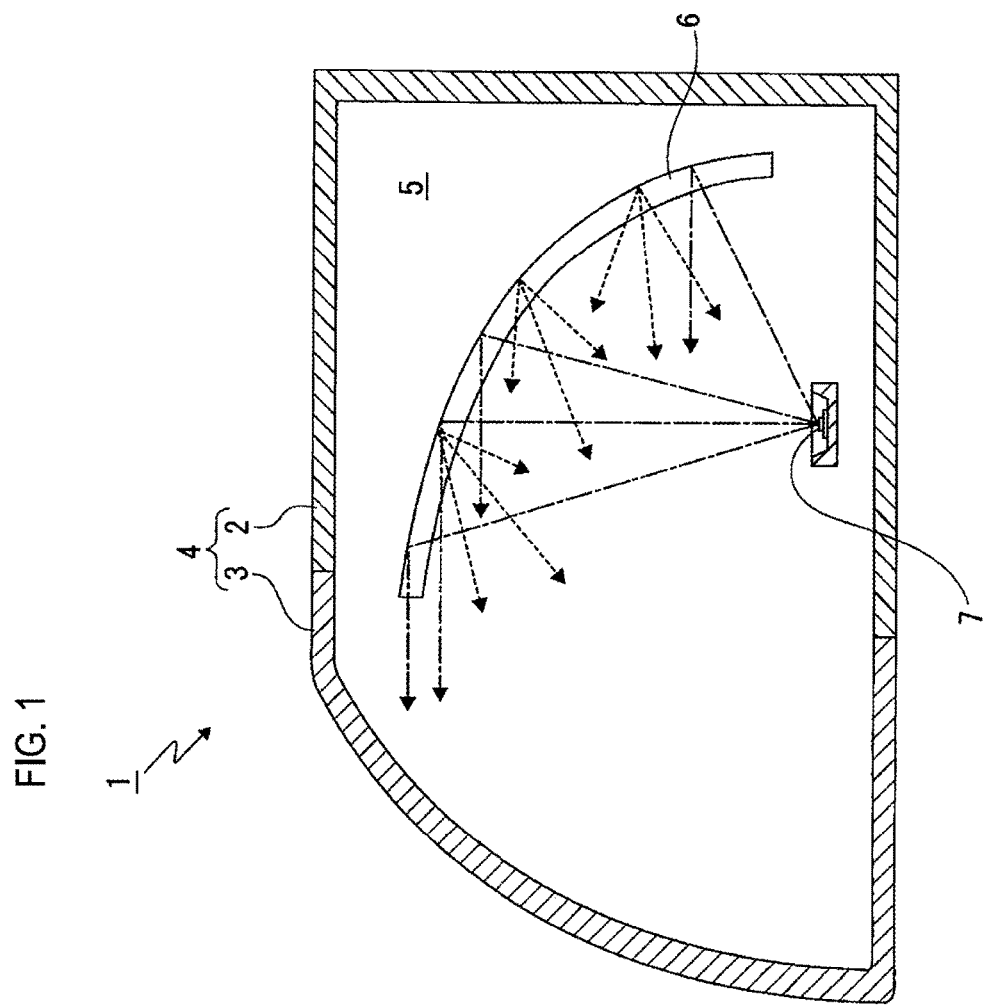
FIG. 1 is a sectional view schematically showing a headlamp according to a first embodiment of the present invention.

FIG. 1 is a partial sectional view schematically showing a configuration of a headlamp 1 (an example of a vehicle lamp) according to a first embodiment of the present invention.

The headlamp 1 is respectively arranged and attached to both left and right end portions in a front end portion of a vehicle body. The headlamp 1 includes a lamp housing 2 having a front opening and a cover 3 for closing the opening. A lamp outer housing 4 is composed of the lamp housing 2 and the cover 3. An internal space of the lamp outer housing 4 is defined as a lamp chamber 5.

A planar light emitting body 6 and a semiconductor light emitting element 7 are disposed in the lamp chamber 5.

Figure 2:
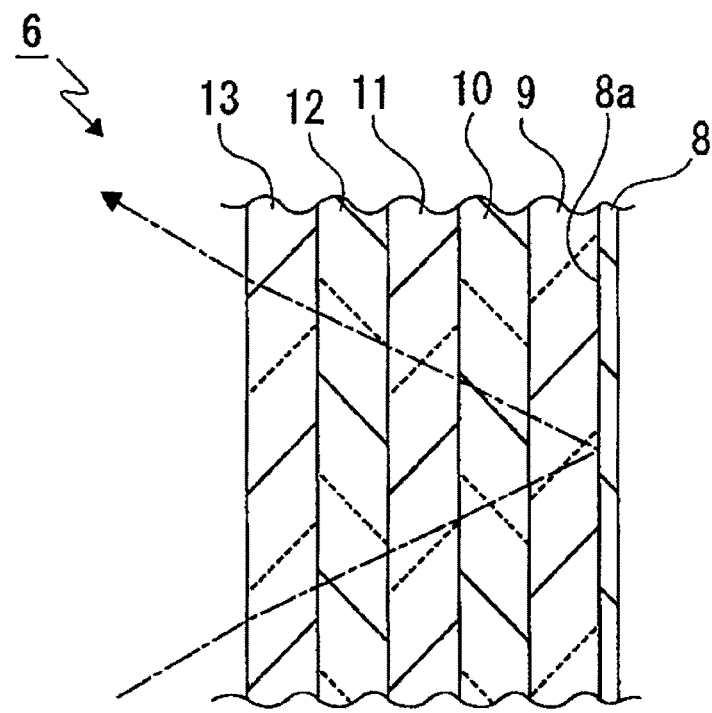
FIG. 2 is an enlarged sectional view showing a layer structure of a planar light emitting body in the headlamp shown in FIG. 1.

The planar light emitting body 6 has a shape that is curved forward as it goes upward. As shown in FIG. 2, the planar light emitting body 6 has a configuration that a reflective layer 8, a back-side protective layer 9, a back-side electrode layer 10, a light emitting layer 11, a front-side electrode layer 12 and a front-side protective layer 13 are laminated in order from the rear side.

The reflective layer 8 is formed in such a way that a metal such as aluminum is deposited on one surface of the back-side protective layer 9. A bonding surface between the reflective layer 8 and the back-side protective layer 9 is formed as a reflective surface 8a. The back-side protective layer 9 is formed by a glass material or a transparent resin material such as acrylic or polycarbonate. As the back-side electrode layer 10, a transparent electrode such as ITO (Indium Tin Oxide) or ATO (Antimony Doped Tindioxide) is used, for example. As the light emitting layer 11, a self-luminous organic EL (Electro Luminescence) is used. As the front-side electrode layer 12, a transparent electrode such as ITO or ATO is used, for example. The front-side protective layer 13 is formed by a glass material or a transparent resin material such as acrylic or polycarbonate. The back-side electrode layer 10 is a cathode and the front-side electrode layer 12 is an anode.

The back-side electrode layer 10 and the front-side electrode layer 12 are connected to a drive circuit (not shown). When voltage is applied from the drive circuit to the back-side electrode layer 10 and the front-side electrode layer 12, the light diffused from the light emitting layer 11 is emitted toward the front. The light emitted passes through the cover 3 and illuminates, as a first illumination light (light beam indicated by a broken line in FIG. 1), the front of the headlamp 1.

The semiconductor light emitting element 7 is disposed below the planar light emitting body 6. As an example of the semiconductor light emitting element 7, an LED (Light Emitting Diode) or a laser diode or the like can be used.

When the drive current is supplied from the drive circuit to the semiconductor light emitting element 7, light having directivity is emitted toward the planar light emitting body 6. The light emitted from the semiconductor light emitting element 7 is incident on the planar light emitting body 6 from the front-side protective layer 13. The incident light passes through the front-side protective layer 13, the front-side electrode layer 12, the light emitting layer 11, the back-side electrode layer 10, and the back-side protective layer 9 in this order. The light is reflected by the reflective surface 8a of the reflective layer 8. Accordingly, the front-side protective layer 13, the front-side electrode layer 12, the light emitting layer 11, the back-side electrode layer 10 and the back-side protective layer 9 serve as a transmitting layer through which the light emitted from the semiconductor light emitting element 7 is caused to pass. The reflective layer 8 serves as a control layer for controlling a travelling direction of the light by reflecting the light emitted from the semiconductor light emitting element 7 in a predetermined direction.

The light reflected by the reflective surface 8a of the reflective layer 8 passes through the back-side protective layer 9, the back-side electrode layer 10, the light emitting layer 11, the front-side electrode layer 12, and the front-side protective layer 13 in this order. Then, the light is emitted from the planar light emitting body 6. The light emitted passes through the cover 3 and illuminates, as a second illumination light (light beam indicated by a dashed line in FIG. 1), the front of the headlamp 1.

The light emitted from the planar light emitting body 6 in this way is used as an illumination light (an example of the first illumination light) for a clearance lamp, for example. The light emitted from the semiconductor light emitting element 7 is used as an illumination light (an example of the second illumination light) for a turn signal lamp or a daytime running lamp, for example. Namely, the headlamp 1 is a front combination lamp capable of irradiating the illumination light having two different functions.

As described above, in the headlamp 1, the reflective layer 8 for reflecting the light emitted from the semiconductor light emitting element 7 is provided as the control layer. Therefore, it is possible to improve the functionality by respectively and effectively utilizing the light emitted from the planar light emitting body 6 and the light emitted from the semiconductor light emitting element 7 with a simple configuration.

Figure 3:
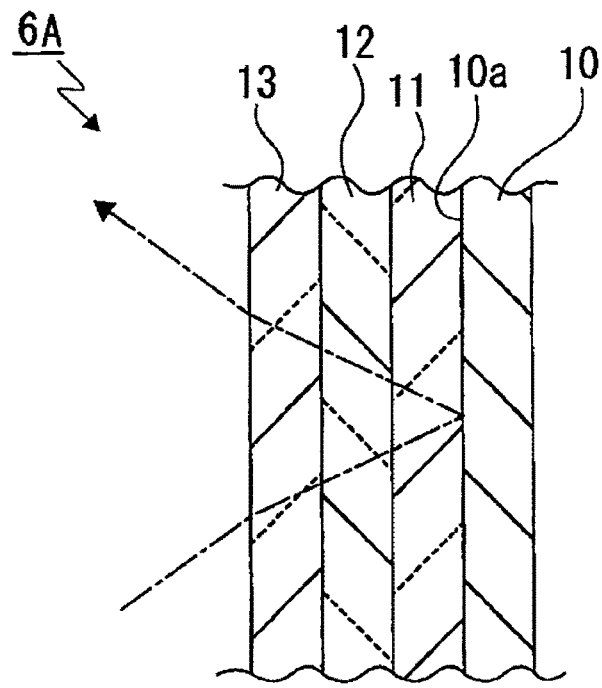
FIG. 3 is an enlarged sectional view showing another example of the planar light emitting body in the headlamp shown in FIG. 1.

FIG. 3 shows a configuration of a planar light emitting body 6A according to a modified example. In the present modified example, the back-side electrode layer 10 is formed by a metallic material having a high reflectivity, and a bonding surface of the back-side electrode layer 10 with the light emitting layer 11 is formed as a reflective surface 10a. In this case, at least the reflective layer 8 of the reflective layer 8 and the back-side protective layer 9 becomes unnecessary, so that the planar light emitting body 6 can be made thinner and a manufacturing time of the planar light emitting body 6 can be shortened.

In the case where the reflective surface 10a is formed on the back-side electrode layer 10, the light emitted from the semiconductor light emitting element 7 is incident on the front-side protective layer 13. The light passes through the front-side protective layer 13, the front-side electrode layer 12, and the light emitting layer 11 in this order. Then, the light is reflected by the reflective surface 10a of the back-side electrode layer 10. The light reflected by the reflective surface 10a passes through the light emitting layer 11, the front-side electrode layer 12, and the front-side protective layer 13. The light passed through the front-side protective layer 13 passes through the cover 3, and illuminates, as the second illumination light, the front of the headlamp 1. Therefore, in this case, the front-side protective layer 13, the front-side electrode layer 12, and the light emitting layer 11 serve as a transmitting layer through which the light emitted from the semiconductor light emitting element 7 is caused to pass. Further, the back-side electrode layer 10 serves as a control layer for controlling a travelling direction of the light by reflecting the light emitted from the semiconductor light emitting element 7 in a predetermined direction.

Figure 4:
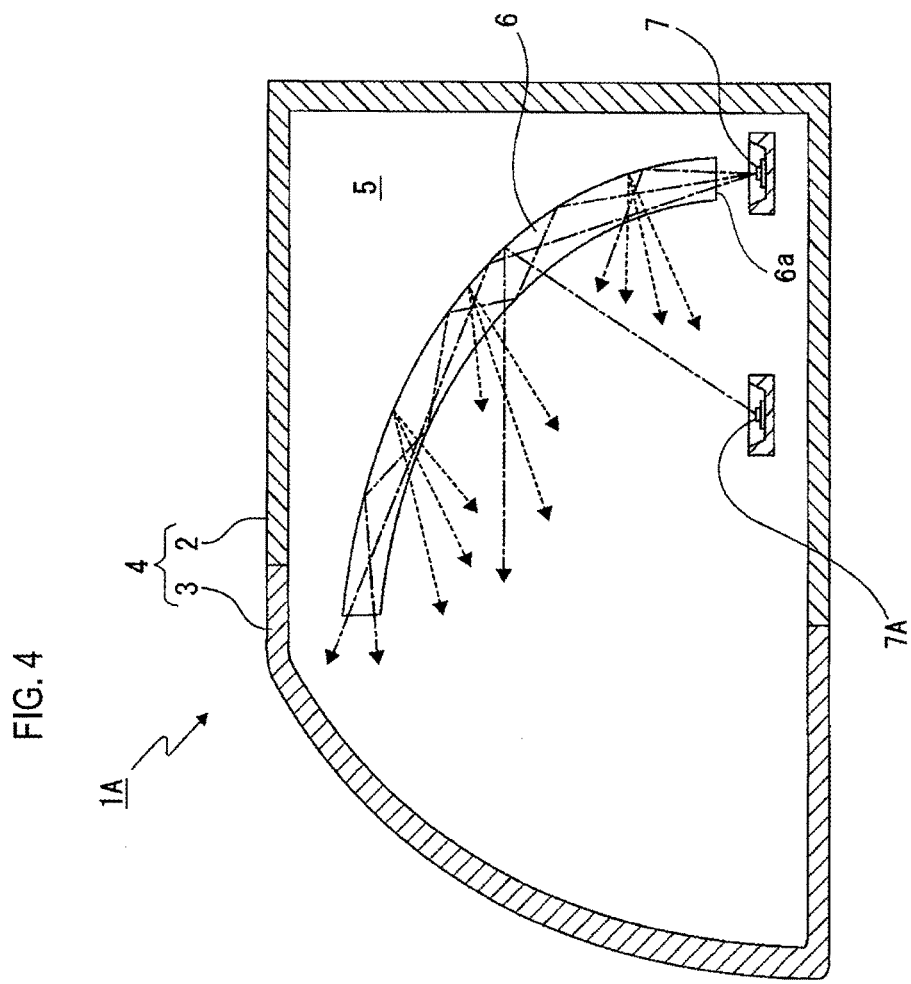
FIG. 4 is a sectional view schematically showing a headlamp according to a second embodiment of the present invention.

FIG. 4 is a partial sectional view schematically showing a configuration of a headlamp 1A (an example of the vehicle lamp) according to a second embodiment of the present invention.

The headlamp 1A according to the present embodiment is different from the headlamp 1 according to the first embodiment only in that the light emitted from the semiconductor light emitting element is guided in the interior of the planar light emitting body. The parts having the same or similar configuration or function as the headlamp 1 according to the first embodiment are denoted by the same reference numerals, and a duplicated description thereof is omitted.

In the headlamp 1A, the planar light emitting body 6, the semiconductor light emitting element 7, and a semiconductor light emitting element 7A are disposed in the lamp chamber 5.

A lower surface (an example of a first end surface) of the planar light emitting body 6 is formed as an incident surface 6a.

In the planar light emitting body 6, the light diffused from the light emitting layer 11 is emitted toward the front when a voltage is applied from the drive circuit to the back-side electrode layer 10 and the front-side electrode layer 12. The light passes through the cover 3 and illuminates, as the first illumination light, the front of the headlamp 1A.

The semiconductor light emitting element 7 is disposed at a position facing the incident surface 6a and below the planar light emitting body 6.

Similarly to the example shown in FIG. 2, light having directivity is emitted and incident on the incident surface 6a when a drive current is supplied from the drive circuit to the semiconductor light emitting element 7. The light emitted from the semiconductor light emitting element 7 is guided upward in the interior of the planar light emitting body 6 and reflected by the reflective surface 8a of the reflective layer 8. The light reflected by the reflective surface 8a of the reflective layer 8 is emitted from the planar light emitting body 6. Then, the light passes through the cover 3 and illuminates, as the second illumination light, the front of the headlamp 1A.

By properly setting the refractive index by the selection of the shape and material of each layer of the planar light emitting body 6, the light emitted from the semiconductor light emitting element 7 may be guided upward while being repeatedly totally reflected between the front surface of the front-side protective layer 13 and the reflective surface 8*a* of the reflective layer 8.

As described above, in the headlamp 1A, the light emitted from the semiconductor light emitting element 7 is incident from the incident surface 6*a* that is one end surface of the planar light emitting body 6. Then, the light is guided in the interior of the planar light emitting body 6 and then irradiated as the second illumination light.

Therefore, the planar light emitting body 6 and the semiconductor light emitting element 7 are disposed side by side, so that it is possible to reduce the size of the headlamp 1A. Further, since the light emitted from the semiconductor light emitting element 7 can be guided to a required position and emitted from a desired position, it is possible to improve a degree of freedom for the design and functionality of the headlamp 1A.

The headlamp 1A according to the present embodiment includes the planar light emitting body 6 having a laminated structure shown in FIG. 2. However, the headlamp 1A may include the planar light emitting body 6A having a laminated structure shown in FIG. 3.

Figure 5:
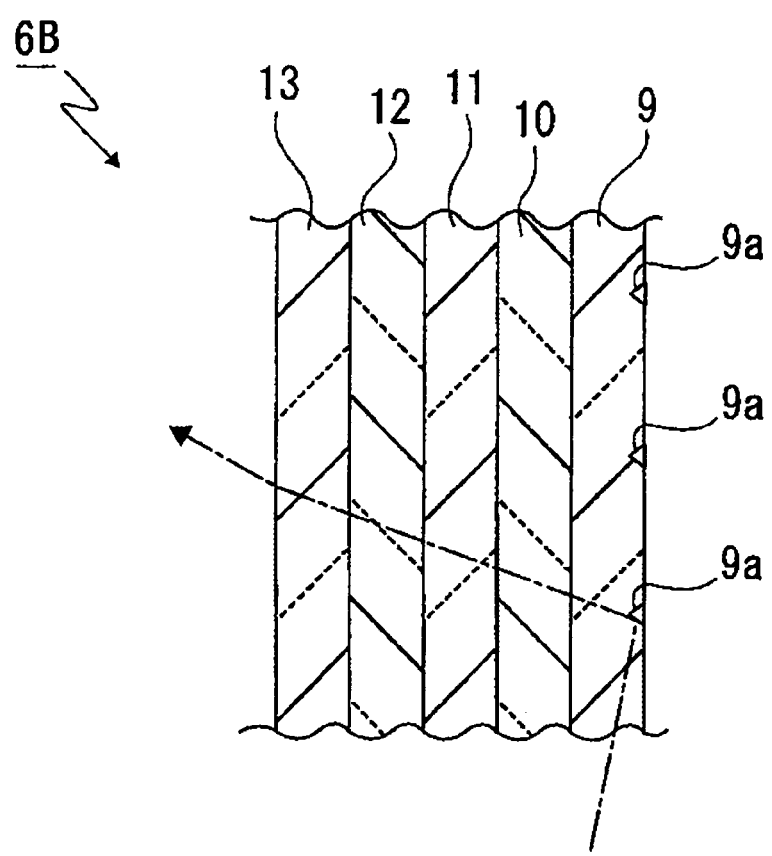
FIG. 5 is an enlarged sectional view showing a modified example of a planar light emitting body in the headlamp shown in FIG. 4.

Further, the headlamp 1A may include a planar light emitting body 6B having a laminated structure shown in FIG. 5. In the planar light emitting body 6B, concave and convex portions 9*a* such as a step, an embossing or a stippling are provided in the back-side protective layer 9. The light emitted from the semiconductor light emitting element 7 and guided in the interior of the planar light emitting body 6 is reflected by the concave and convex portions 9*a* and emitted from the planar light emitting body 6B. In this case, the back-side protective layer 9 serves as a control layer for controlling a travelling direction of the light by reflecting the light emitted from the semiconductor light emitting element 7 in a predetermined direction.

By forming the concave and convex portions 9*a* in this way, the incident light is securely reflected at a desired position, and hence, it is possible to improve the functionality. Further, since there is no need to provide the reflective layer, the planar light emitting body 6 can be made thinner.

Figure 6:
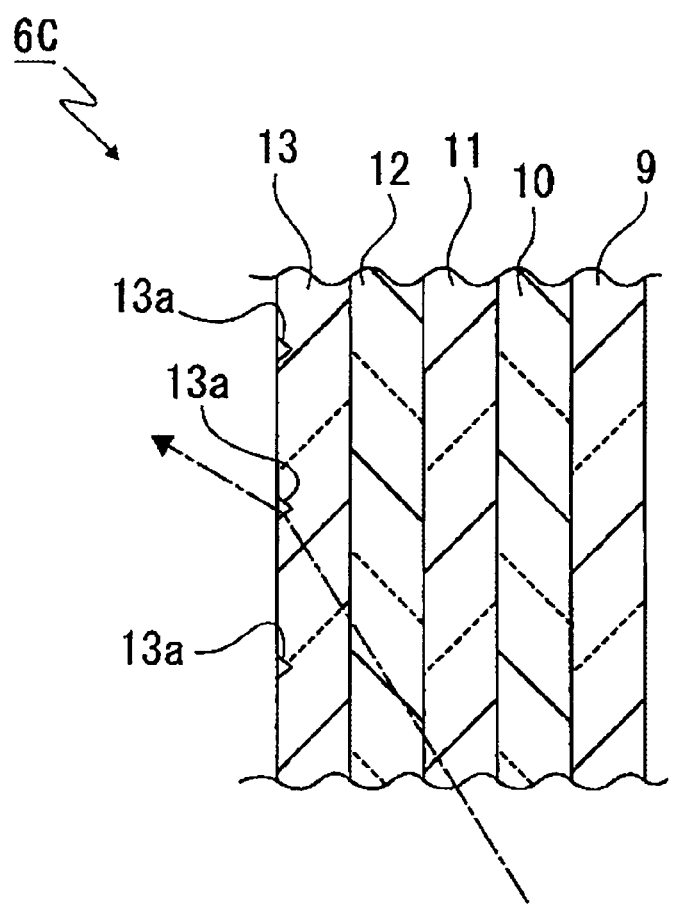
FIG. 6 is an enlarged sectional view showing a modified example of a planar light emitting body in the headlamp shown in FIG. 4.

Moreover, the headlamp 1A may include a planar light emitting body 6C having a laminated structure shown in FIG. 6. In the planar light emitting body 6C, concave and convex portions 13*a* such as a step, an embossing or a stippling are provided in the front-side protective layer 13. The light emitted from the semiconductor light emitting element 7 and guided in the interior of the planar light emitting body 6 is emitted from the planar light emitting body 6C through the concave and convex portions 13*a*. In this case, the front-side protective layer 13 serves as a control layer for controlling a travelling direction of the light by emitting the light emitted from the semiconductor light emitting element 7 in a predetermined direction By forming the concave and convex portions 13*a* in this way, the incident light is securely emitted at a desired position, and hence, it is possible to improve the functionality.

Although an example has been described where one of the concave and convex portions 9*a* or the concave and convex portions 13*a* is formed, the headlamp may include a planar light emitting body in which both the concave and convex portions 9*a* and the concave and convex portions 13*a* for emitting the light are formed.

Figure 7:
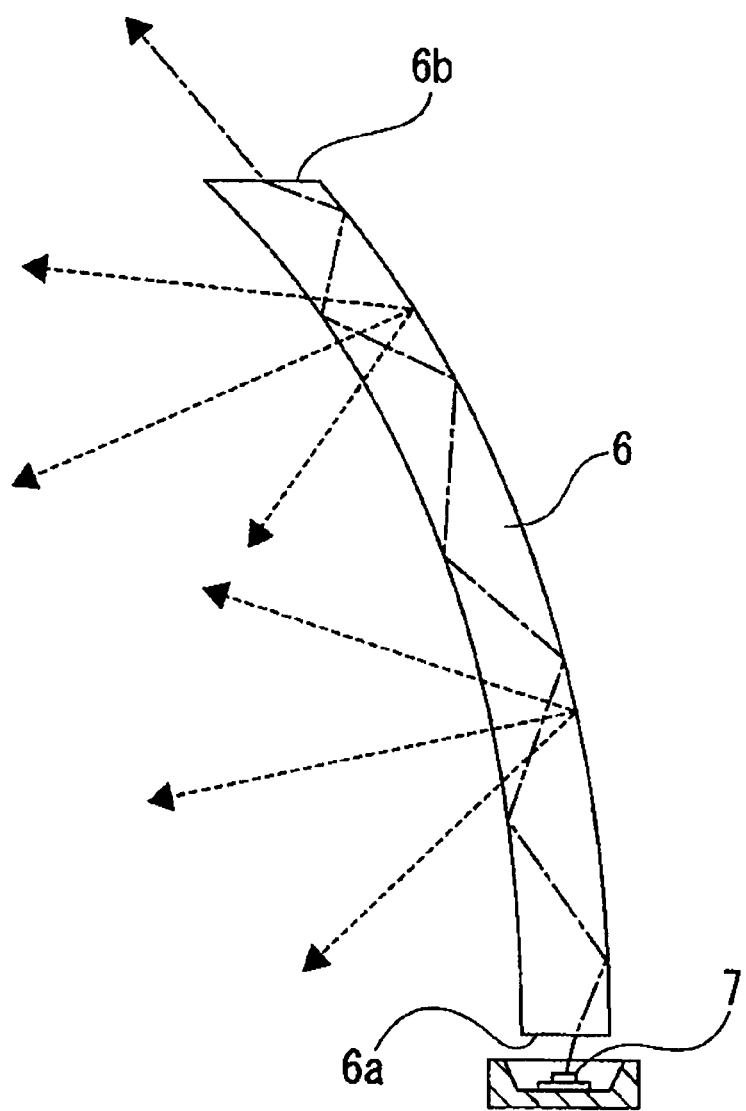
FIG. 7 is a schematic view showing a modified example of the headlamp shown in FIG. 4.

Further, in the headlamp 1A, an end surface of the planar light emitting body 6, which is most distant from the semiconductor light emitting element 7, i.e., an end surface (an example of the second end surface) of the planar light emitting body 6 on the side opposite to the incident surface 6*a* in a longitudinal direction may be formed as an emitting surface 6*b*, as shown in FIG. 7. In this case, the light that is emitted from the semiconductor light emitting element 7 and incident on the incident surface 6*a* is guided in the interior of the planar light emitting body 6 and emitted from the emitting surface 6*b*.

According to this configuration, an irradiation direction of the first illumination light emitted from the planar light emitting body 6 and an irradiation direction of the second illumination light of the semiconductor light emitting element 7, which is emitted from the emitting surface 6*b*, can be respectively set to a different desired direction. Therefore, it is possible to improve a degree of freedom for the design and functionality.

Further, since the light incident from the incident surface 6*a* is emitted from the emitting surface 6*b* that is the other end in the longitudinal direction of the planar light emitting body 6, the whole of the planar light emitting body 6 can be effectively used as a light guide. Therefore, it is possible to improve the functionality of the planar light emitting body 6.

In the headlamp 1A, as shown in FIG. 4, a second semiconductor light emitting element 7A may be disposed, in addition to the semiconductor light emitting element 7 described above. In this case, the light emitted from the semiconductor light emitting element 7A is reflected by the planar light emitting body 6 and irradiated to the front.

According to this configuration, a degree of freedom in setting the irradiation direction of light is improved. Further, usage applications are widened.

Figure 8:
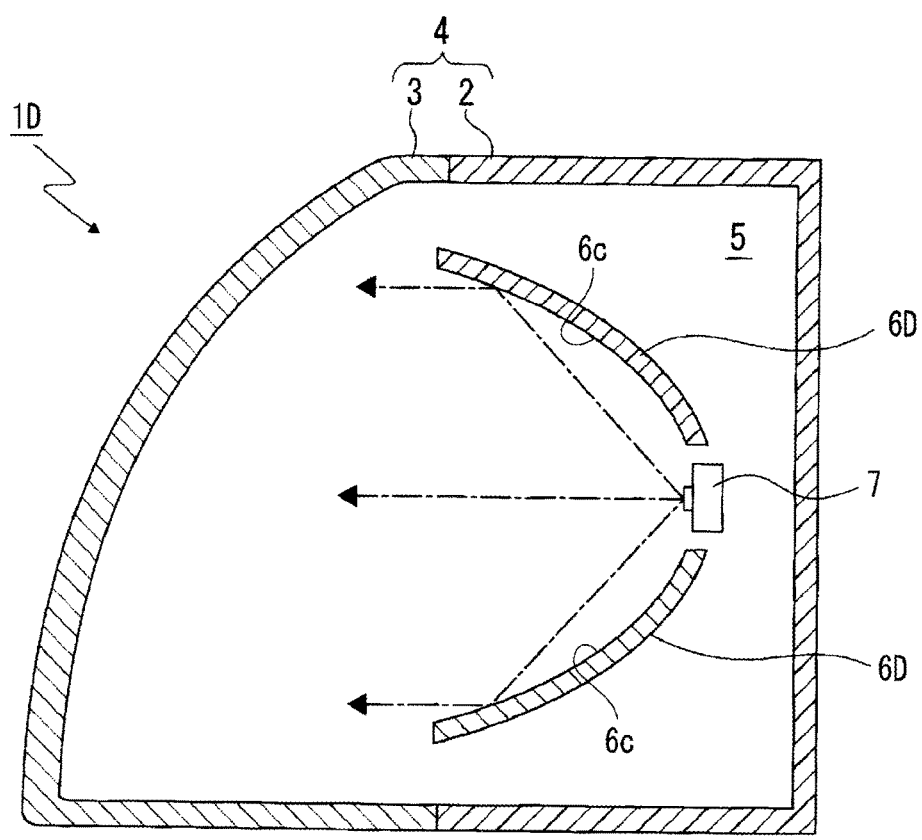
FIG. 8 is a sectional view schematically showing a tail lamp according to a third embodiment of the present invention.

FIG. 8 is a partial sectional view schematically showing a configuration of a tail lamp 1D (an example of the vehicle lamp) according to a third embodiment of the present invention. The parts having the same or similar configuration or function as the headlamp 1 according to the first embodiment are denoted by the same reference numerals, and a duplicated description thereof is omitted.

In the tail lamp 1D, a plurality of planar light emitting bodies 6D is disposed within the lamp chamber 5. The diffused light (not shown) emitted from each of the planar light emitting bodies 6D passes through the cover 3 and illuminates, as the first illumination light, the front of the tail lamp 1D. The first illumination light is an illumination light of a tail lamp, for example.

Figure 9:
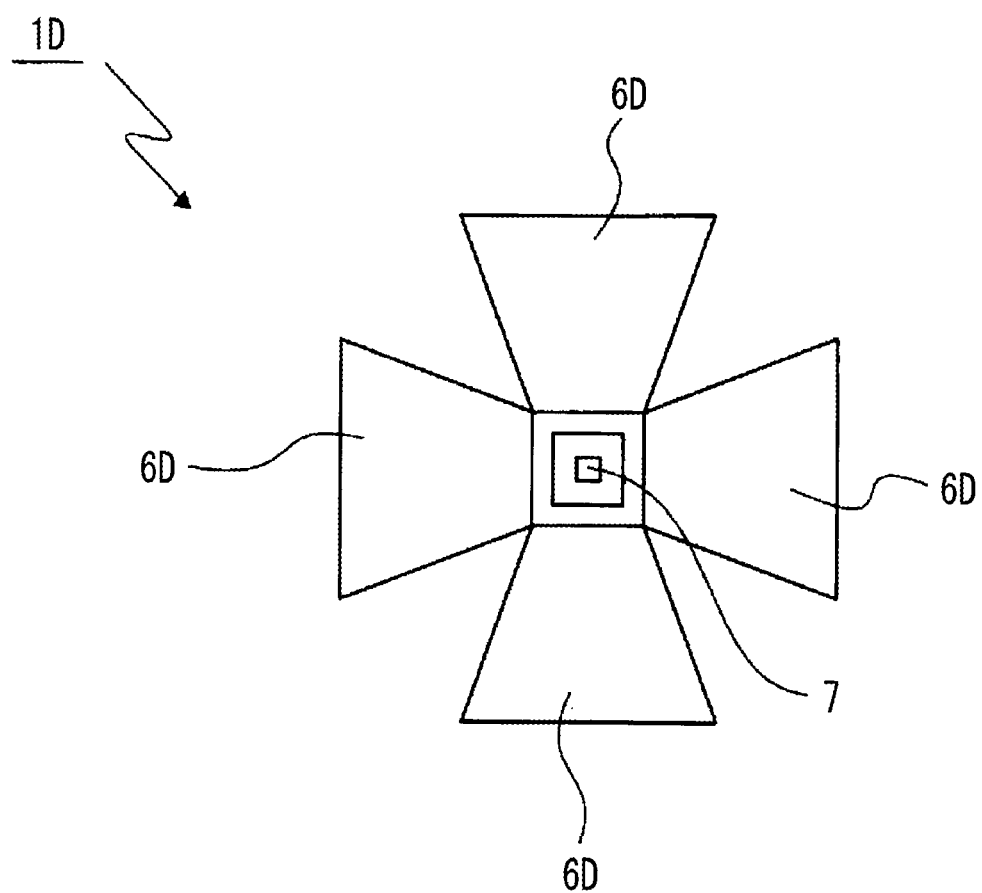
FIG. 9 is a front view showing the arrangement of a planar light emitting body and a semiconductor light emitting element in the tail lamp shown in FIG. 8.

As shown in FIG. 9, the plurality of planar light emitting bodies 6D is disposed so as to surround the semiconductor light emitting element 7, when looking at the tail lamp 1D from the front (the rear of a vehicle).

Each planar light emitting body 6D includes a reflective layer 6*c* that has a parabolic-based shape. The semiconductor light emitting element 7 is disposed on a focal point of each reflective layer 6*c*.

In such a configuration, a portion of the light emitted from the semiconductor light emitting element 7 is reflected by the reflective layer 6*c* of the planar light emitting body 6D, as shown in FIG. 8. The light reflected by the reflective layer 6*c* passes through the cover 3 and illuminates, as the second illumination light, the front of the tail lamp 1D. Therefore, the reflective layer 6*c* of the planar light emitting body 6D serves as a control layer for controlling a travelling direction of the light emitted from the semiconductor light emitting element 7. Other portions of the light emitted from the semiconductor light emitting element 7 pass through the cover 3 without being reflected by the planar light emitting body 6D, and illuminates, as the second illumination light, the front of the tail lamp 1D. The second illumination light is an illumination light for a stop lamp, for example. Namely, the tail lamp 1D is a rear combination lamp capable of irradiating the illumination light having two different functions.

According to the above configuration, it is possible to perform a desired light distribution control and it is also possible to improve the design property.

Figure 10:
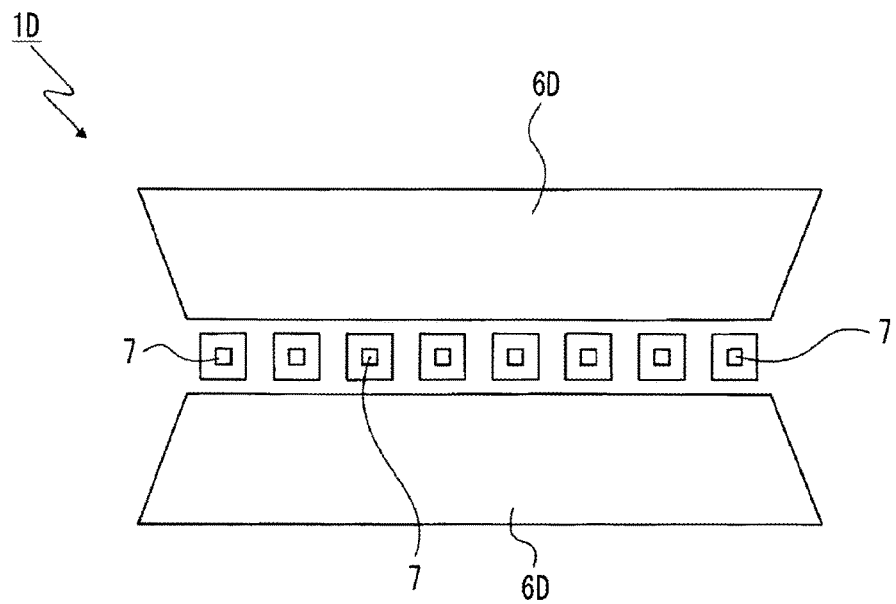
FIG. 10 is a front view showing a modified example of the tail lamp shown in FIG. 8.

As shown in FIG. 10, the tail lamp 1D may have a plurality of planar light emitting bodies 6D and a plurality of semiconductor light emitting elements 7.

Specifically, the plurality of semiconductor light emitting elements 7 is arranged in the lateral direction to form an element array. The plurality of planar light emitting bodies 6D is extended along an arrangement direction of the plurality of semiconductor light emitting elements 7 and disposed above and below the element array.

Figure 11:
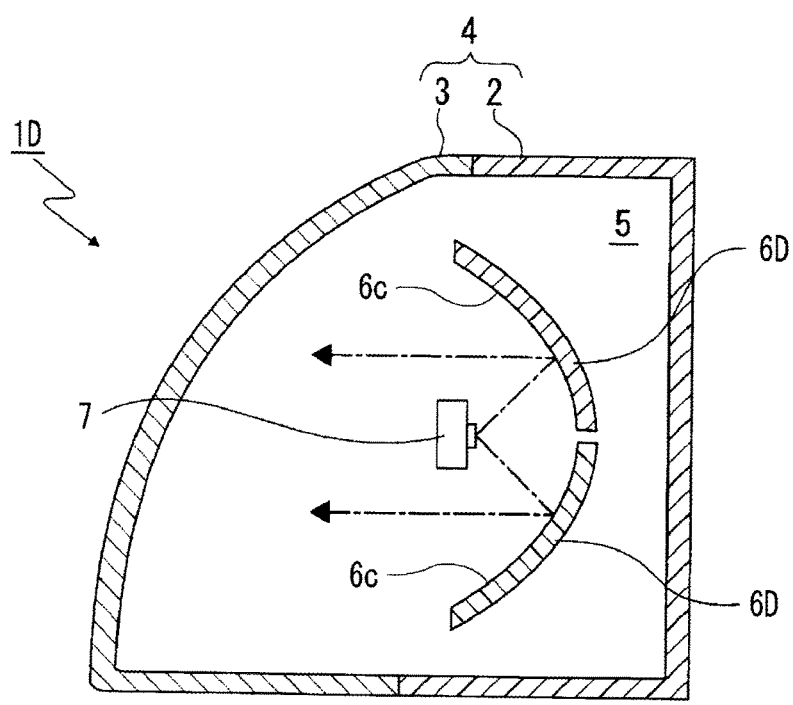
FIG. 11 is a sectional view showing a modified example of the tail lamp shown in FIG. 8.

Further, in the tail lamp 1D, the plurality of planar light emitting bodies 6D and at least one semiconductor light emitting element 7 may be arranged as shown in FIG. 11. Specifically, a light emitting surface of the semiconductor light emitting element 7 faces the direction opposite to the cover 3.

In this case, the light emitted from the semiconductor light emitting element 7 is reflected by the reflective layer 6c of each planar light emitting body 6D. The light reflected by the reflective layer 6c passes through the cover 3 and illuminates, as the second illumination light, the front of the tail lamp 1D.

In each of the embodiments described above, the light incident on the planar light emitting bodies 6 (6A, 6B, 6C, 6D) is emitted by the semiconductor light emitting element 7.

Therefore, the heat generation by the light incident on the planar light emitting body 6 is suppressed. Accordingly, there is no need to provide a special heat-resistance structure and heat-radiation structure for the planar light emitting body 6. As a result, it is possible to reduce the manufacturing cost and it is also possible to improve a degree of freedom for the design.

The planar light emitting bodies 6 (6A, 6B, 6C, 6D) which have been illustrated with reference to each of the embodiments described above have a gently curved shape. However, the planar light emitting bodies 6 (6A, 6B, 6C, 6D) may be configured by combining a plurality of portions which is formed in a planar shape, for example.

Further, in the headlamps 1, 1A, 1B, 1C and the tail lamp 1D, the first and second illumination light may be configured in different colors according to the usage or function of each of the first and second illumination light.

Figure 12:
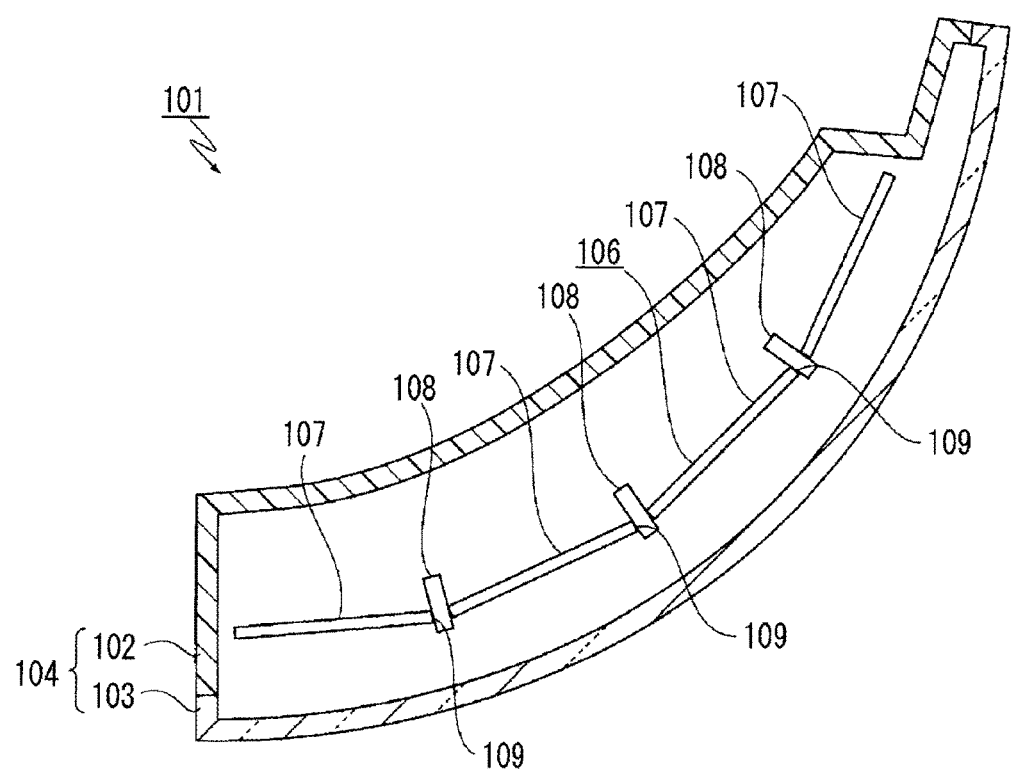
FIG. 12 is a sectional view schematically showing a tail lamp according to a fourth embodiment of the present invention.

FIG. 12 is a partial sectional view schematically showing a configuration of a tail lamp 101 (an example of the vehicle lamp) according to a fourth embodiment of the present invention.

The tail lamp 101 is respectively arranged and attached to both left and right end portions in a rear end portion of a vehicle body. The tail lamp 101 includes a lamp housing 102 having a rear opening and a cover 103 for closing the opening. A lamp outer housing 104 is composed of the lamp housing 102 and the cover 103. An internal space of the lamp outer housing 104 is defined as a lamp chamber 105.

A lamp unit 106 is disposed in the lamp chamber 105. The lamp unit 106 includes a plurality of planar light emitting bodies 107 and a plurality of light source bodies 108. The plurality of planar light emitting bodies 107 and the plurality of light source bodies 108 are alternately disposed.

Figure 13:
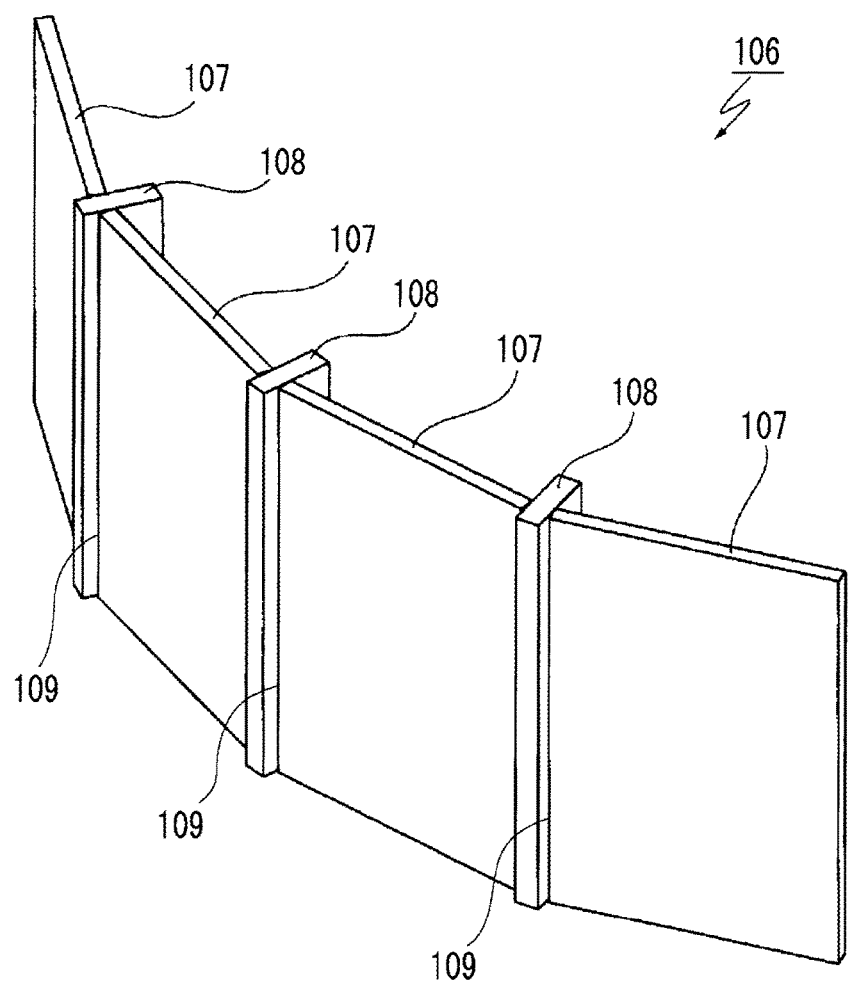
FIG. 13 is a perspective view showing a portion of a lamp unit that is included in the tail lamp shown in FIG. 12.

As shown in FIG. 13, each of the planar light emitting bodies 107 has a flat shape. The plurality of planar light emitting bodies 107 is arranged so as to draw a curve as a whole, depending on the shape of the lamp outer housing 104. Further, the plurality of planar light emitting bodies 107 is arranged in a state where a gap 109 is formed between adjacent planar light emitting bodies 107. Particularly in the case where the planar light emitting bodies 107 are arranged so as to draw a curve as a whole, the gap 109 is easily formed between adjacent planar light emitting bodies 107.

Figure 14:
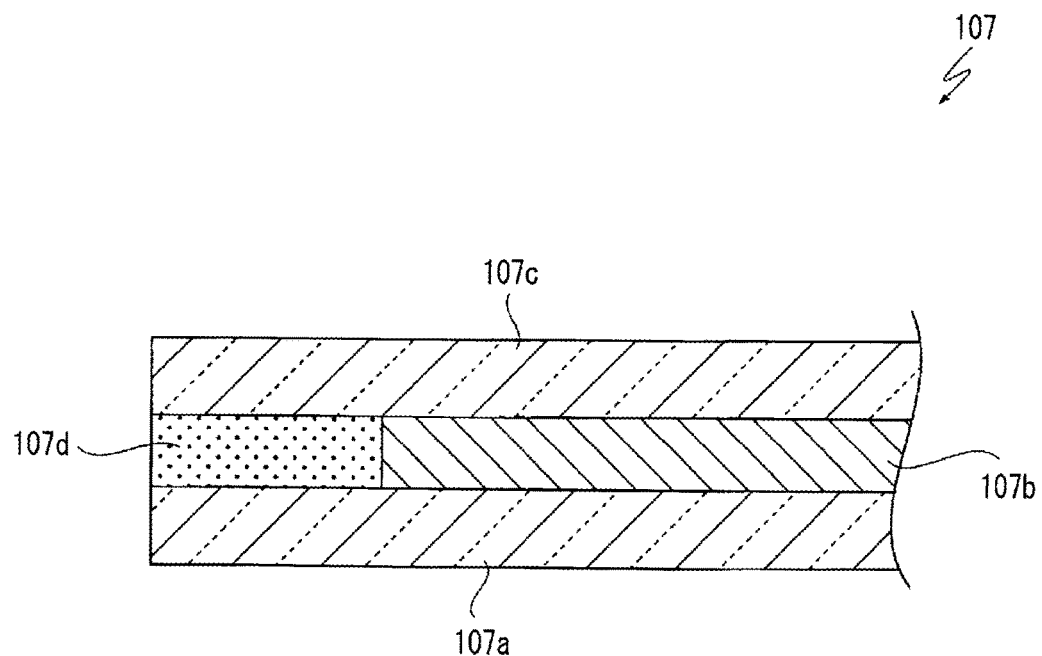
FIG. 14 is a sectional view showing a planar light emitting body that is included in the lamp unit shown in FIG. 13.

As shown in FIG. 14, each of the planar light emitting bodies 107 has a configuration that a front surface protective layer 107a, an inner layer 107b and a back surface protective layer 107c are laminated in this order. Further, an outer peripheral portion of the front surface protective layer 107a is bonded to an outer peripheral portion of the back surface protective layer 107c by an adhesion layer 107d. The inner layer 107b has a dimension smaller than the front surface protective layer 107a and the back surface protective layer 107c. The inner layer 107b is sealed on the inside of the adhesion layer 107d. The adhesion layer 107d includes a light emitting layer and a pair of electrode layers. As a voltage is applied to the pair of electrode layers, light is emitted from the light emitting layer. Therefore, in the planar light emitting body 107, light is not emitted from an outer peripheral portion in which the adhesion layer 107d is present.

Figure 15:
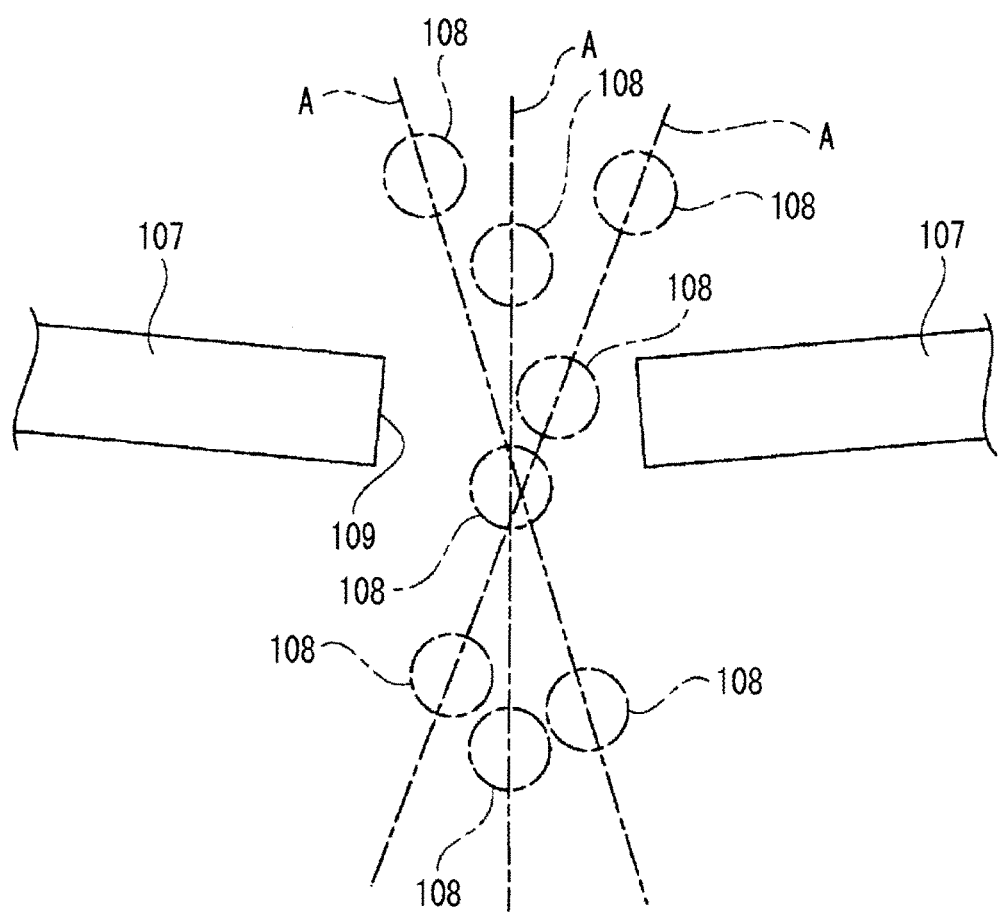
FIG. 15 is a conceptual view showing the arrangement of a light source body that is included in the lamp unit shown in FIG. 13.

As shown in FIGS. 12 and 13, at least a portion of each light source body 108 is disposed in the gap 109 formed between the planar light emitting bodies 107. Here, as shown in FIG. 15, at least a portion of the light source body 108 may be disposed on a line A intersecting with the gap 9. Therefore, the light source body 108 may be arranged before and after the gap 9. Each circle indicated by a dashed line in FIG. 15 conceptually shows an example of arrangement places of the light source bodies 108.

Figure 16:
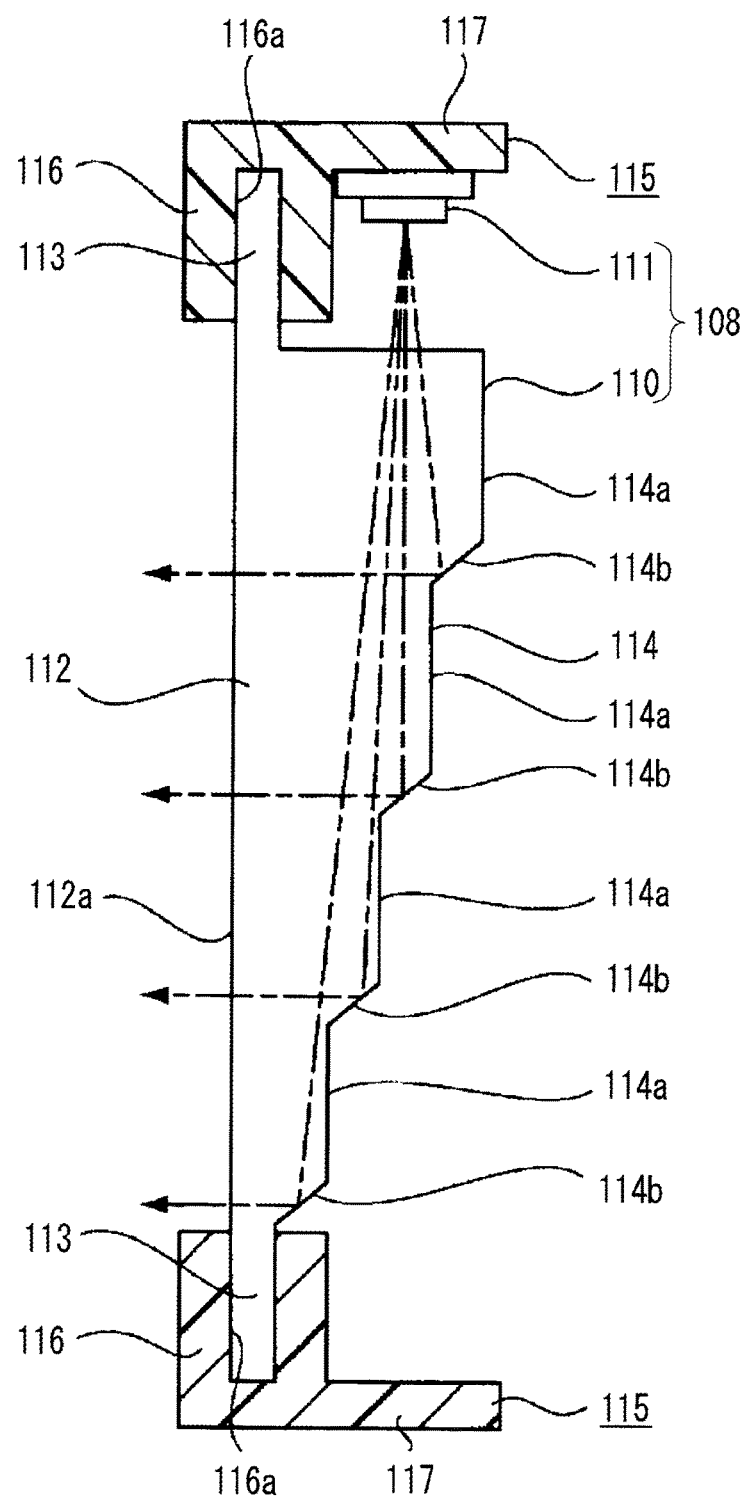
FIG. 16 is a partial sectional side view showing a configuration of the light source body that is included in the lamp unit shown in FIG. 13.

As shown in FIG. 16, the light source body 108 includes a light guide 110 and a light source 111 for emitting light toward the light guide 110. As the light source 111, an LED (Light Emitting Diode) or a laser diode is used, for example.

The light guide 110 includes a base portion 112 whose shape is vertically long and an attached portion 113 protruding respectively upward and downward from a rear end portion of the base portion 112. A rear surface of the base portion 112 is formed as an emitting surface 112a. A front end portion of the base portion 112 has a stepped control portion 114 in which a width in the longitudinal direction is reduced as it goes downward. The control portion 114 has a vertical surface 114a facing rearward and a reflective surface 114b that is inclined in the longitudinal direction and the vertical direction. The vertical surface 114a and the reflective surface 114b are alternately arranged. The vertical surface 114a and the reflective surface 114b, which are adjacent to each other, are continuous.

In the lamp unit 106, the light source body 108 is held in a pair of frames 115. The pair of frames 115 are spaced apart in the vertical direction and attached to the lamp housing 102. The pair of frames 115 may be formed integrally with the lamp housing 102.

Each frame 115 has an attaching portion 116 and a protruding portion 117 that is projected forwardly from the attaching portion 116. An insertion groove 116a that is opened downward or upward is formed in the attaching portion 116.

On a lower surface of the protruding portion 117 of the frame 115 disposed on the upper side, a plurality of light sources 111 is attached at a gap in an arrangement direction of the planar light emitting bodies 107. Light is emitted downward from each light source 111.

Figure 17:
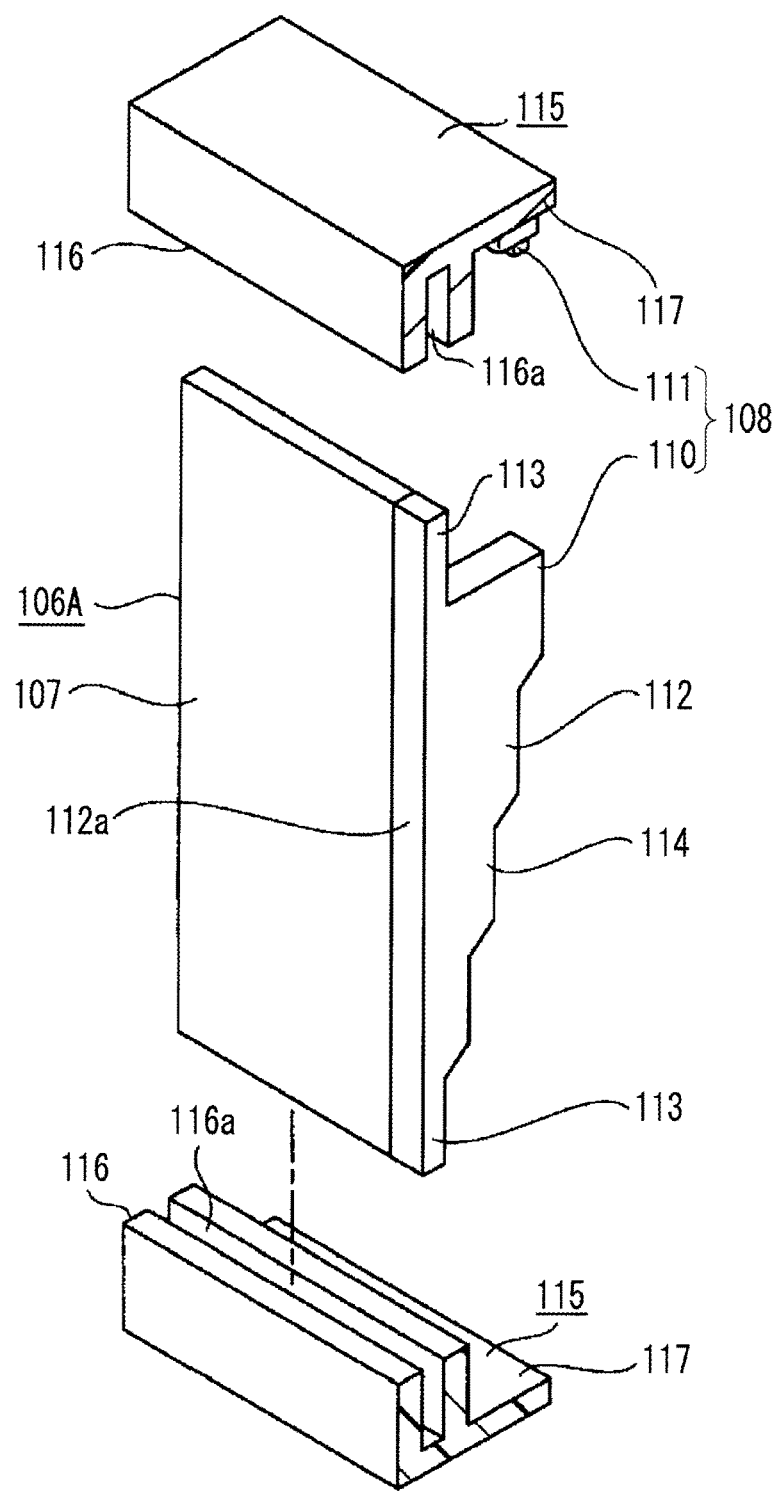
FIG. 17 is an exploded perspective view showing the light source body shown in FIG. 16.

As shown in FIG. 17, both upper and lower ends of each planar light emitting body 107 and the attached portion 113 of each light source body 108 are held in the frames 115 by being inserted into the insertion grooves 116a, respectively. In the state where the light source body 108 is held in the frames 115, an upper surface of the base portion 112 of the light guide 110 is disposed so as to face the light source 111. At this time, the portion of each planar light emitting body 107, on which the adhesion layer 107d is provided, is inserted into the insertion groove 116. The portion of each planar light emitting body 107, on which the inner layer 107b (light emitting layer) is provided, is exposed without being shielded by the frame 115.

The light emitted from the light source 111 is incident on the base portion 112 of the light guide 110. The light is guided downward and internally reflected by the reflective surface 114b. The light whose path is changed in this way is emitted from the emitting surface 112a of the light guide 110. The light emitted from the light guide 110 passes through the cover 103 and illuminates the front (the rear of the vehicle) of the tail lamp 101.

The planar light emitting body 107 is configured such that light can be emitted in the same or similar direction as the emitting direction of light from the light guide 110. At this time, light is not emitted from the gap 109 formed between adjacent planar light emitting bodies 107 and the portion of the planar light emitting body 107, on which the adhesion layer 107d is provided. However, the light guide 110 of the light source body 108 is disposed on these portions from which light is not emitted, thereby emitting light.

Therefore, a partial dark portion is unlikely to occur in a light distribution pattern that is formed by the tail lamp 101. As a result, it is possible to suppress the discomfort which is felt by a driver.

Further, the light source body 108 includes the light guide 110 that is extended in the vertical direction and disposed along the gap 109. The light emitted from the light source 111 is guided in a direction along the gap 109 by the light guide 110. In this way, there is no need to place the plurality of light sources 111 in an extension direction of the light guide 110. As a result, it is possible to reduce the manufacturing cost by the reduction in the number of parts.

Moreover, in the light source body 108, a portion of the light guide 110 is disposed in the gap 109, as shown in FIGS. 12 and 13. Therefore, the gap 109 can be effectively utilized as a portion of a space for arranging the light source body 108. As a result, it is possible to reduce the size of the tail lamp 101.

Figure 18:
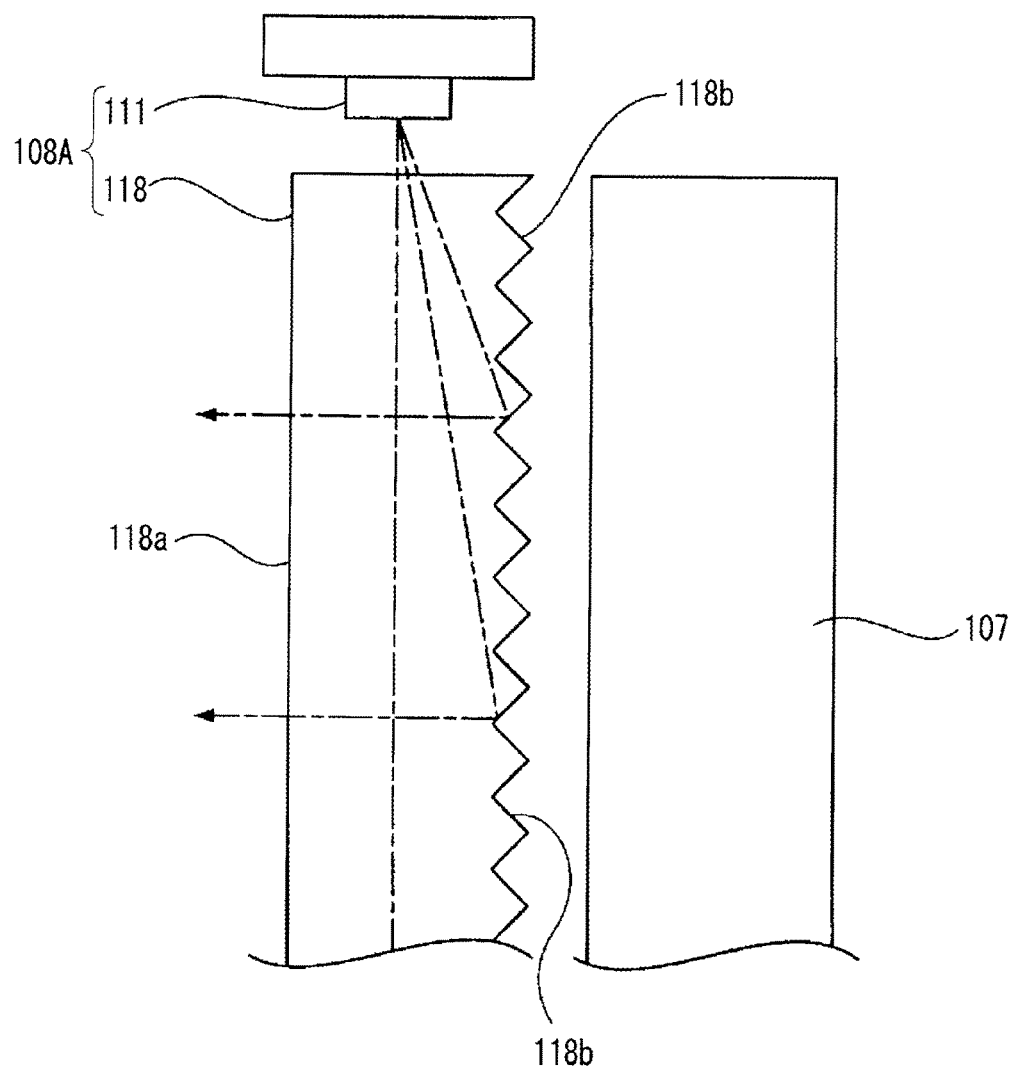
FIG. 18 is a side view showing a portion of a first modified example of the light source body.

FIG. 18 shows a light source body 108A according to a first modified example. The light source body 108A includes a light guide 118 and the light source 111 for emitting light toward the light guide 118. The light source body 108A is disposed immediately behind the gap 109.

The light guide 118 has a shape that is vertically long. A rear surface of the light guide 118 is formed as an emitting surface 118a. A plurality of lens steps 118b is formed on the front surface of the light guide 118. The light guide 118 is disposed in such a way that an upper surface faces the light source 111. The light source 111 may be disposed below the light guide 118. Further, the light source 111 may be disposed on both upper and lower sides of the light guide 118, respectively.

The light emitted from the light source 111 is incident on the light guide 118. The light is guided downward and internally reflected by the lens step 118b. The light whose path is changed in this way is emitted from the emitting surface 118a of the light guide 118. The light emitted from the light guide 118 passes through the cover 103 and illuminates the front (the rear of the vehicle) of the tail lamp 101.

The light guide 118 of the light source body 108A is disposed on the portion where light is not emitted from the planar light emitting body 107, thereby emitting light. Therefore, a partial dark portion is unlikely to occur in a light distribution pattern that is formed by the tail lamp 101. As a result, it is possible to suppress the discomfort which is felt by a driver.

Further, the light guide 118 of the light source body 108A is disposed in a direction in which light is emitted from the planar light emitting body 107, i.e., on the rear side of the planar light emitting body 107. Therefore, the light emitted from the light guide 118 of the light source body 108A is not shielded by an outer peripheral portion of the planar light emitting body 107. As a result, it is possible to improve the utilization efficiency of the light emitted from the light source body 108A.

Moreover, the light source body 108A includes the light guide 118 that is extended in the vertical direction and disposed along the gap 109. The light emitted from the light source 111 is guided in a direction along the gap 109 by the light guide 118. In this way, there is no need to place the plurality of light sources 111 in an extension direction of the light guide 118. As a result, it is possible to reduce the manufacturing cost by the reduction in the number of parts.

Figure 19:
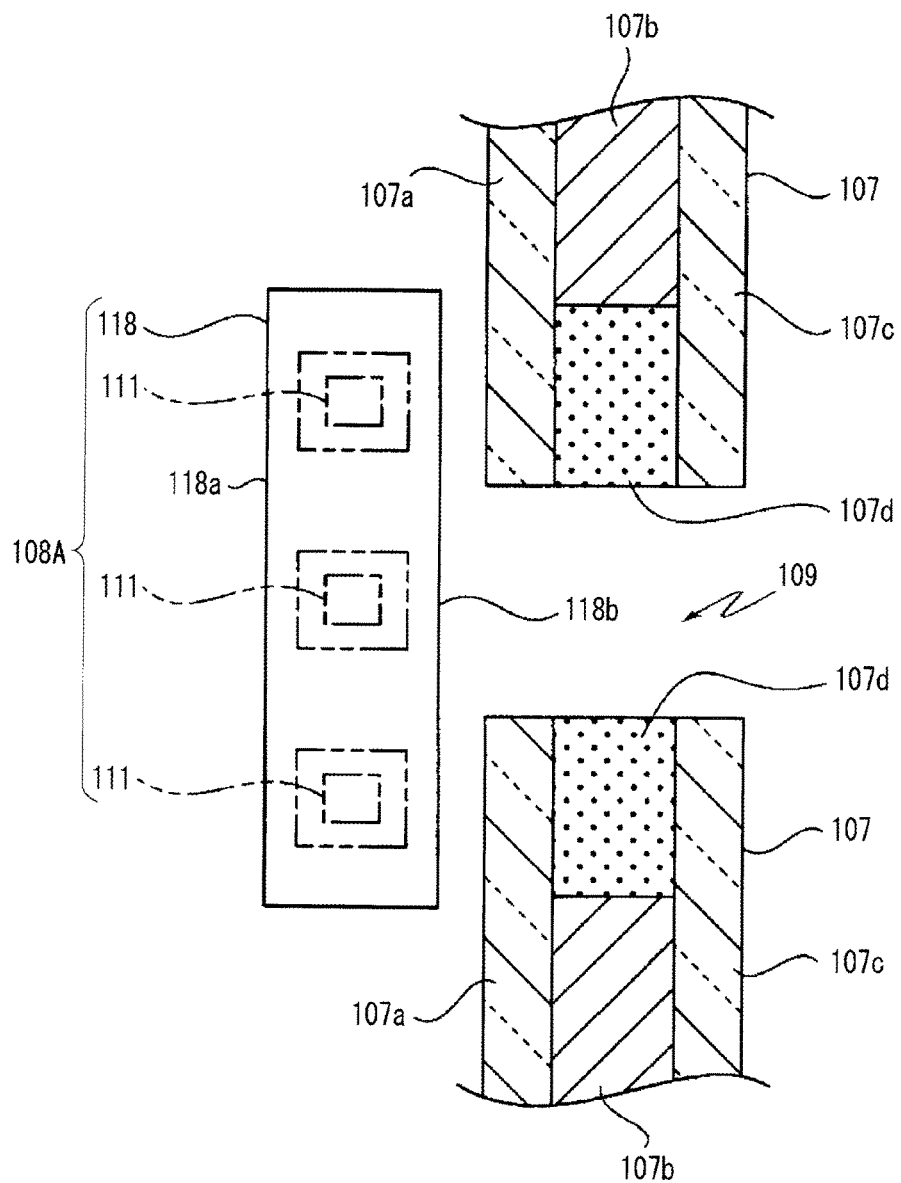
FIG. 19 is a plan view showing a modified example of the light source body shown in FIG. 18.

As shown in FIG. 19, a dimension in the lateral direction of the light guide 118 may be greater than a width of the gap 109. In this case, the plurality of light sources 111 can be disposed at positions facing the upper surface of the light guide 118.

According to this configuration, light can be securely emitted from the rear side of the adhesion layer 107d of the planar light emitting body 107. In this way, it is possible to further reduce the occurrence of unevenness of light in the light distribution pattern.

Also in the example shown in FIG. 19, the light source 111 may be disposed at the lower side or both upper and lower sides of the light guide 118.

Figure 20:
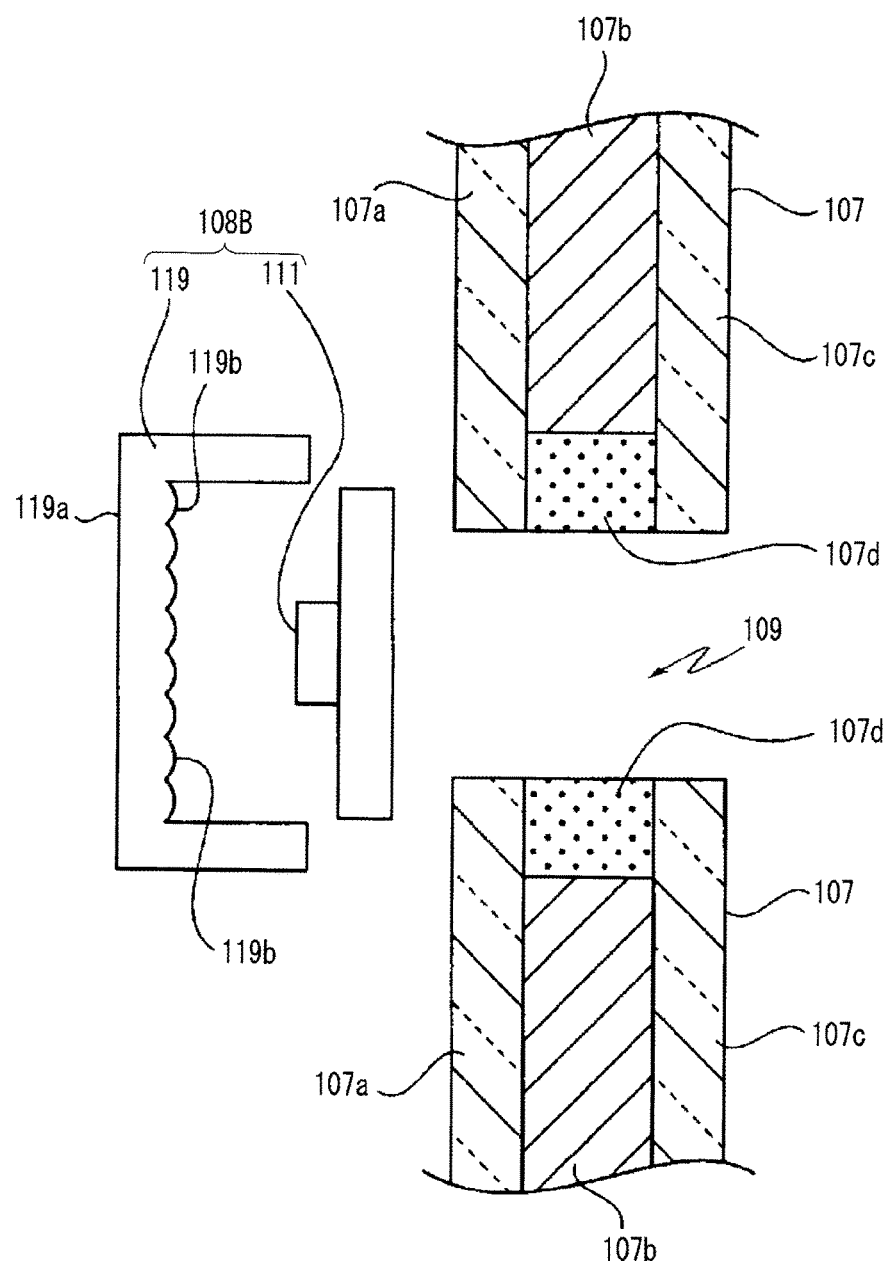
FIG. 20 is a plan view showing a portion of a second modified example of the light source body.

FIG. 20 shows a light source body 108B according to a second modified example. The light source body 108B includes a lens body 119 and a plurality of light sources 111 for emitting light toward the lens body 119.

Figure 21:
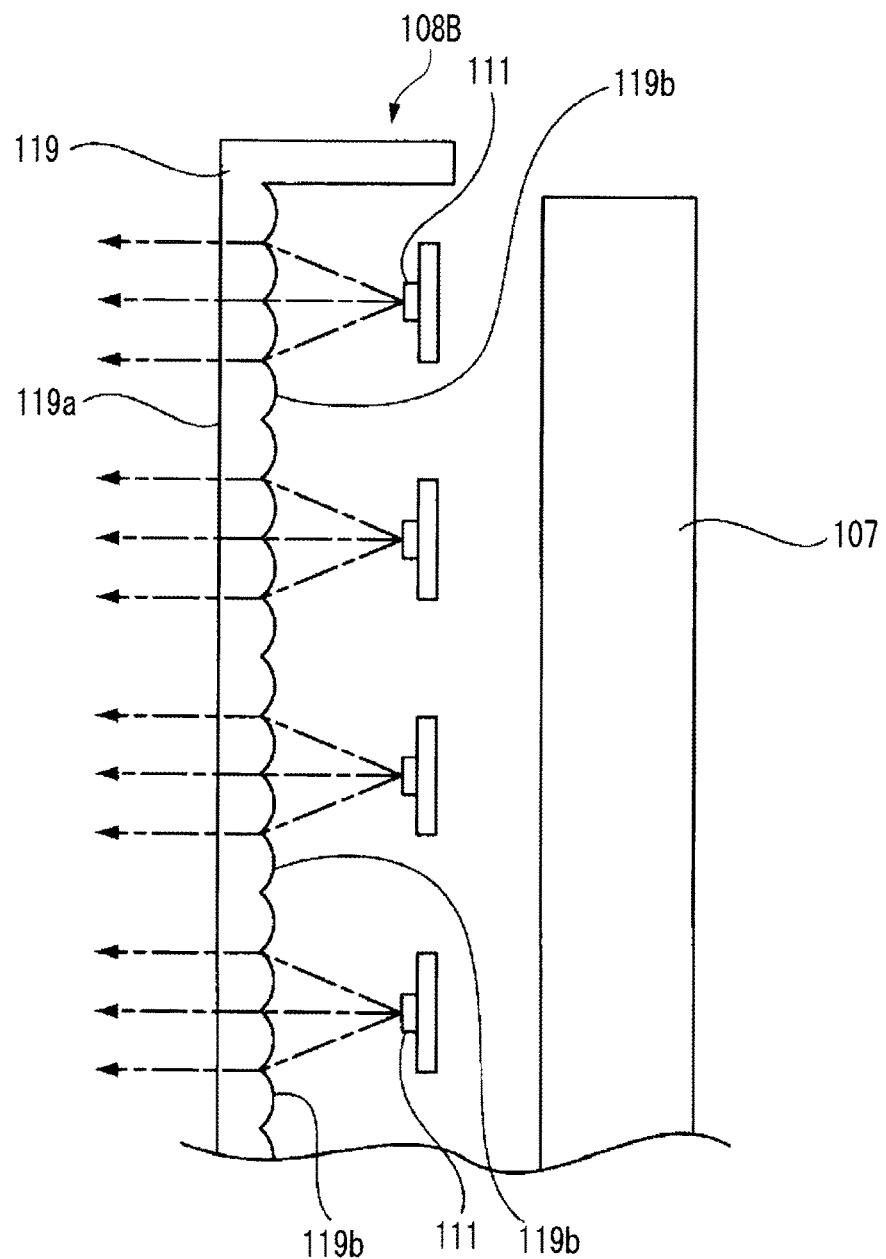
FIG. 21 is a side view showing a portion of the light source body shown in FIG. 20.

As shown in FIG. 21, the lens body 119 has a shape that is vertically long. A rear surface of the lens body 119 is formed as an emitting surface 119a. A plurality of lens steps 119b is formed on the front surface of the light guide 119 on the side opposite to the emitting surface 119a.

In front of the lens body 119, the plurality of light sources 111 are spaced apart in the vertical direction. The plurality of light sources 111 is disposed so as to face the lens steps 119b, respectively.

The light emitted from the light source 111 is incident on the lens body 119 and diffused in the vertical direction and the lateral direction by the lens steps 119b. The light whose path is changed in this way is emitted from the emitting surface 119a of the lens body 119. The light emitted from the lens body 119 passes through the cover 103 and illuminates the front (the rear of the vehicle) of the tail lamp 101.

The lens body 119 of the light source body 108B is disposed on the portion where light is not emitted from the planar light emitting body 107, thereby emitting light. Therefore, a partial dark portion is unlikely to occur in a light distribution pattern that is formed by the tail lamp 101. As a result, it is possible to suppress the discomfort which is felt by a driver.

Further, the lens body 119 of the light source body 108B is disposed in a direction in which light is emitted from the planar light emitting body 107, i.e., on the rear side of the planar light emitting body 107. Therefore, the light emitted from the lens body 119 of the light source body 108B is not shielded by the outer peripheral portion of the planar light emitting body 107. As a result, it is possible to improve the utilization efficiency of the light emitted from the light source body 108B.

Figure 22:
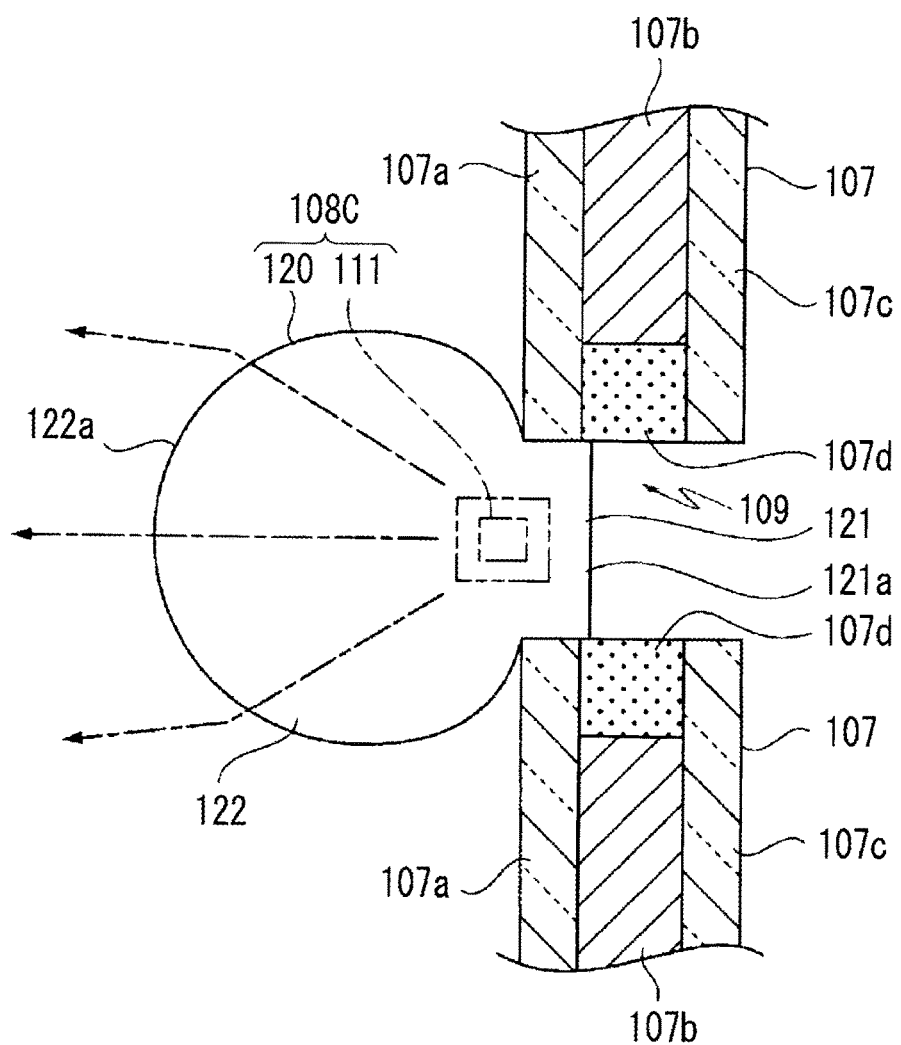
FIG. 22 is a plan view showing a portion of a third modified example of the light source body.

FIG. 22 shows a light source body 108C according to a third modified example. The light source body 108C includes a light guide 120 and the light source 111 for emitting light toward the light guide 120. A front end portion of the light source body 108C is disposed within the gap 109. Other portions of the light source body 108C are disposed behind the planar light emitting body 107.

The light guide 120 has a shape that is vertically long. A front end portion of the light guide 120 is a step forming portion 121 whose front surface is formed with a plurality of lens steps 121a. The plurality of lens steps 121a has the same configuration as the plurality of lens steps 119a shown in FIG. 21. The portion on the rear side of the step forming portion 121 is a substantially cylindrical emitting portion 122. Maximum dimension in the lateral direction of the emitting portion 122 is greater than a width of the gap 109. An outer peripheral surface of the emitting portion 122 is formed as an emitting surface 122a.

The light guide 120 is disposed in such a way that an upper surface faces the light source 111. The light source 111 may be disposed below the light guide 120. Further, the light source 111 may be disposed at both upper and lower sides of the light guide 120, respectively.

The light emitted from the light source 111 is incident on the light guide 120. The light is guided downward and internally reflected by the lens step 121a. In this way, the light whose path is changed to be diffused in the vertical direction and lateral direction is emitted from the emitting surface 122a of the light guide 120. The light emitted from the light guide 120 passes through the cover 103 and illuminates the front (the rear of the vehicle) of the tail lamp 101.

The light guide 120 of the light source body 1080 is disposed on the portion where light is not emitted from the planar light emitting body 107, thereby emitting light. Therefore, a partial dark portion is unlikely to occur in a light distribution pattern that is formed by the tail lamp 101. As a result, it is possible to suppress the discomfort which is felt by a driver.

Further, the emitting portion 122 of the light guide 120 of the light source body 108C is disposed in a direction in which light is emitted from the planar light emitting body 107, i.e., on the rear side of the planar light emitting body 107. Therefore, the light emitted from the light guide 120 of the light source body 108C is not shielded by the outer peripheral portion of the planar light emitting body 107. As a result, it is possible to improve the utilization efficiency of the light emitted from the light source body 108C.

Moreover, the light source body 108C includes the light guide 120 that is extended in the vertical direction and disposed along the gap 109. The light emitted from the light source 111 is guided in a direction along the gap 109 by the light guide 120. In this way, there is no need to place the plurality of light sources 111 in an extension direction of the light guide 120. As a result, it is possible to reduce the manufacturing cost by the reduction in the number of parts.

Furthermore, since the maximum dimension in the lateral direction of the emitting portion 122 of the light guide 120 is greater than a width of the gap 109, light can be securely emitted from the rear side of the adhesion layer 107d of the planar light emitting body 107. In this way, it is possible to further reduce the occurrence of unevenness of light in the light distribution pattern.

Additionally, in the light source body 108C, a portion of the light guide 120 is disposed within the gap 109. Therefore, the gap 109 can be effectively utilized as a portion of a space for arranging the light source body 108C. As a result, it is possible to reduce the size of the tail lamp 101.

Figure 23:
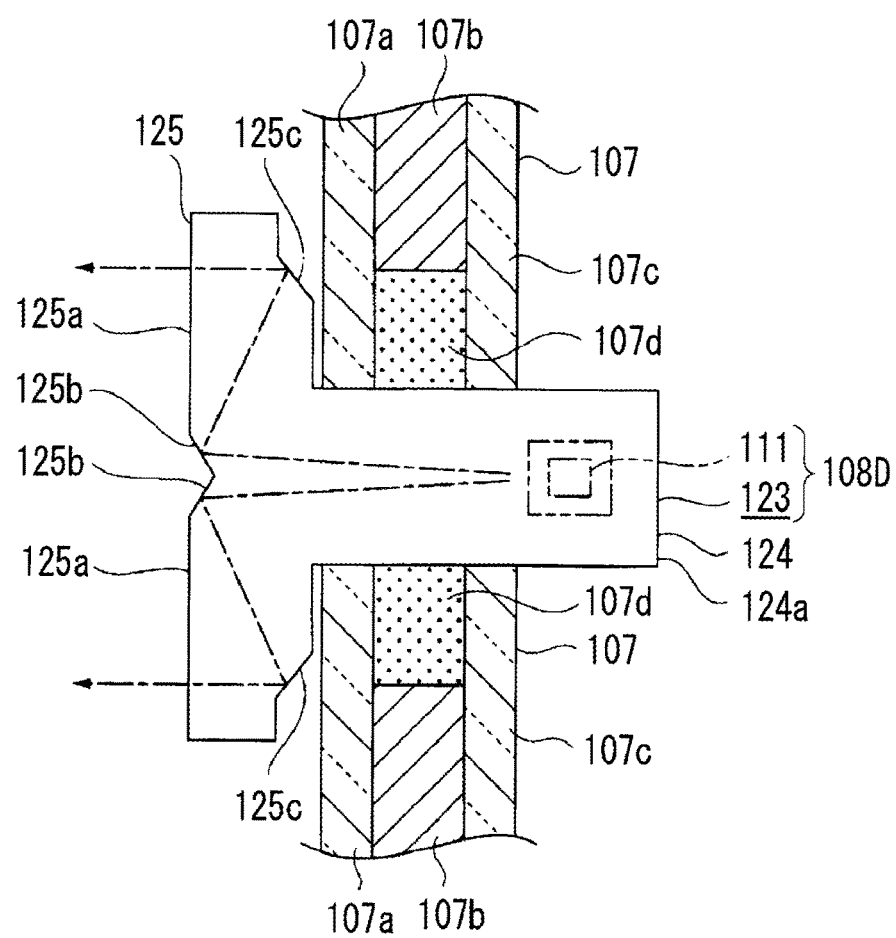
FIG. 23 is a plan view showing a portion of a fourth modified example of the light source body.

FIG. 23 shows a light source body 108D according to a fourth modified example. The light source body 108D includes a light guide 123 and the light source 111 for emitting light toward the light guide 123.

The light guide 123 has a shape that is vertically long. Further, the light guide 123 has a T-shaped horizontal cross section. The light guide 123 includes a step forming portion 124 and an emitting portion 125. The step forming portion 124 has a longitudinal dimension greater than a lateral dimension. The emitting portion 125 is continuous to a rear end of the step forming portion 124. The emitting portion 125 has a longitudinal dimension smaller than a lateral dimension.

A plurality of lens steps 124a is formed on the front surface of the step forming portion 124. The plurality of lens steps 124a has the same configuration as the plurality of lens steps 119a shown in FIG. 21.

A dimension in the lateral direction of the emitting portion 125 is greater than a width of the gap 109. In a rear surface of the emitting portion 125, the portion other than a central portion in the lateral direction is formed as an emitting surface 125a. A pair of first reflective surfaces 125b is provided on the central portion in the lateral direction of the rear surface of the emitting portion 125. The pair of first reflective surfaces 125b is continuous in the lateral direction. A second reflective surface 125c is respectively formed at positions adjacent to both left and right ends on the front surface of the emitting portion 125.

The step forming portion 124 of the light guide 123 is inserted into the gap 109. A front end portion of the step forming portion 124 is disposed in front of the planar light emitting body 107. The emitting portion 125 is disposed immediately behind the planar light emitting body 107. The light guide 123 is disposed in such a way that an upper surface of the front end portion of the step forming portion 124 is disposed so as to face the light source 111. The light source 111 may be disposed below the light guide 123. Further, the light source 111 may be disposed on both upper and lower sides of the light guide 123, respectively.

The light emitted from the light source 111 is incident on the light guide 123. The light is guided downward and internally reflected by the lens step 124a. The light whose path is changed in this way is directed rearward and internally reflected by the first reflective surfaces 125b. The light reflected by the first reflective surfaces 125b is directed toward the second reflective surface 125c and internally reflected again by the second reflective surface 125c. The light reflected by the second reflective surface 125c is emitted from the emitting surface 125a of the light guide 123. The light emitted from the light guide 123 passes through the cover 103 and illuminates the front (the rear of the vehicle) of the tail lamp 101.

The light guide 123 of the light source body 108D is disposed on the portion where light is not emitted from the planar light emitting body 107, thereby emitting light. Therefore, a partial dark portion is unlikely to occur in a light distribution pattern that is formed by the tail lamp 101. As a result, it is possible to suppress the discomfort which is felt by a driver.

Further, the emitting portion 125 of the light guide 123 of the light source body 108D is disposed in a direction in which light is emitted from the planar light emitting body 107, i.e., on the rear side of the planar light emitting body 107. Therefore, the light emitted from the light guide 123 of the light source body 108D is not shielded by the outer peripheral portion of the planar light emitting body 107. As a result, it is possible to improve the utilization efficiency of the light emitted from the light source body 108D.

Moreover, the light source body 108D includes the light guide 123 that is extended in the vertical direction and disposed along the gap 109. The light emitted from the light source 111 is guided in a direction along the gap 109 by the light guide 123. In this way, there is no need to place the plurality of light sources 111 in an extension direction of the light guide 123. As a result, it is possible to reduce the manufacturing cost by the reduction in the number of parts.

Furthermore, since the maximum dimension in the lateral direction of the emitting portion 125 of the light guide 123 is greater than a width of the gap 109, light can be securely emitted from the rear side of the adhesion layer 107d of the planar light emitting body 107. In this way, it is possible to further reduce the occurrence of unevenness of light in the light distribution pattern.

Additionally, in the light source body 108D, a portion of the light guide 123 is disposed within the gap 109. Therefore, the gap 109 can be effectively utilized as a portion of a space for arranging the light source body 108D. As a result, it is possible to reduce the size of the tail lamp 101.

The scope of the present invention is not limited to the front combination lamp and the rear combination lamp. The present invention can be widely applied to various combination lamps which have two lamp functions of a headlamp, a clearance lamp, a turn signal lamp, a stop lamp, a tail lamp, a daytime running lamp, a cornering lamp, a hazard lamp, a position lamp, a back lamp, a fog lamp, etc.

The contents of Japanese Patent Application No. 2013-066666 filed on Mar. 27, 2013 and Japanese Patent Application No. 2013-102248 filed on May 14, 2013, which constitute a part of the present application, are incorporated herein.

What is claimed is:

1. A vehicle lamp comprising:
   a lamp chamber defined by a lamp housing having an opening and a cover for closing the opening;
   a plurality of planar light emitting bodies arranged at a gap in the lamp chamber; and
   a light guide of which at least a portion is arranged on a line intersecting with the gap,
   the light guide protruding from a first direction and a second direction opposite from the first direction, the first and second directions being substantially parallel with a thickness direction of the plurality of planar light emitting bodies.

2. The vehicle lamp according to claim 1, wherein a first portion of the light guide protruding in the first direction is larger than a second portion of the light guide protruding in the second direction.

3. The vehicle lamp according to claim 1, wherein the light guide comprises a light guide, and
   the light guide is extended in a direction intersecting with a direction in which light is emitted from the planar light emitting body, and is arranged along the gap.

4. The vehicle lamp according to claim 3, wherein at least a portion of the light guide is disposed on the side where light is emitted from the planar light emitting bodies, than the planar light emitting bodies, and
   a dimension in a width direction of the gap of at least the portion of the light guide, which is disposed on the side where the light is emitted, is greater than a width of the gap.

* * * * *